United States Patent
Ganesh et al.

(10) Patent No.: US 12,386,863 B2
(45) Date of Patent: *Aug. 12, 2025

(54) MICRO-PARTITION CLUSTERING BASED ON EXPRESSION PROPERTY METADATA

(71) Applicant: SNOWFLAKE INC., Bozeman, MT (US)

(72) Inventors: Varun Ganesh, San Carlos, CA (US); Alvin E. Jou, Woodinville, WA (US); Donghe Kang, Columbus, OH (US); Ryan Michael Thomas Shelly, San Francisco, CA (US); Jiaqi Yan, Menlo Park, CA (US); Yizhi Zhu, Bellevue, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,234

(22) Filed: Apr. 18, 2023

(65) Prior Publication Data

US 2024/0354315 A1 Oct. 24, 2024

(51) Int. Cl.
*G06F 16/28* (2019.01)
*G06F 16/2455* (2019.01)

(52) U.S. Cl.
CPC ...... *G06F 16/285* (2019.01); *G06F 16/24556* (2019.01)

(58) Field of Classification Search
None
See application file for complete search history.

(56) References Cited

U.S. PATENT DOCUMENTS

| | | | |
|---|---|---|---|
| 2016/0162599 A1 | 6/2016 | Dickie et al. | |
| 2017/0264640 A1 | 9/2017 | Narayanaswamy et al. | |
| 2018/0068008 A1* | 3/2018 | Cruanes | G06F 16/211 |
| 2020/0167361 A1 | 5/2020 | Princehouse et al. | |
| 2020/0272628 A1* | 8/2020 | Dageville | G06F 16/221 |
| 2022/0253441 A1 | 8/2022 | Baptist | |
| 2022/0382751 A1 | 12/2022 | Dhuse et al. | |

FOREIGN PATENT DOCUMENTS

| | | |
|---|---|---|
| CN | 110100242 A | 8/2019 |
| CN | 110825794 B | 2/2020 |
| KR | 20210135548 A | 11/2021 |

* cited by examiner

*Primary Examiner* — Amresh Singh
(74) *Attorney, Agent, or Firm* — WOMBLE BOND DICKINSON (US) LLP

(57) ABSTRACT

A method for selecting micro-partitions for a clustering operation includes: storing table data in a plurality of micro-partitions of a storage device, wherein each of the plurality of micro-partitions comprises a portion of the table data, wherein subsets of the plurality of micro-partitions are associated with a respective one of a plurality of expression property (EP) files, and wherein each of the plurality of EP files comprises an EP data region that represents the portions of the table data of the subset of the plurality of micro-partitions associated with the EP file; determining sub-ranges of the table data based on the EP data regions of the plurality of EP files; selecting a subset of the plurality of EP files for a clustering operation based on the sub-ranges of the table data; and performing the clustering operation on the micro-partitions associated with the subset of the EP files.

17 Claims, 15 Drawing Sheets

MICRO-PARTITION CLUSTERING BASED ON EXPRESSION PROPERTY METADATA

TECHNICAL FIELD

The present disclosure relates to databases and database management, and, more particularly, relates to clustering micro-partitions containing database data.

BACKGROUND

Databases are widely used for data storage and access in computing applications. Databases may include one or more tables that include data that can be joined, read, modified, or deleted using queries. Databases can store small or extremely large sets of data within one or more tables. This data can be accessed by various users in an organization or even be used to service public users, such as via a website or an application programming interface (API). The large amount of data that can be contained within a database can often be useful for various types of data analytics, which involves the attempt to determine conclusions and/or predictions based on analysis of the information contained in the data. When working with large volumes of data, improvements to the efficiency of database queries can provide significant improvements to the cost and time associated with the data analysis.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

Figure 1:
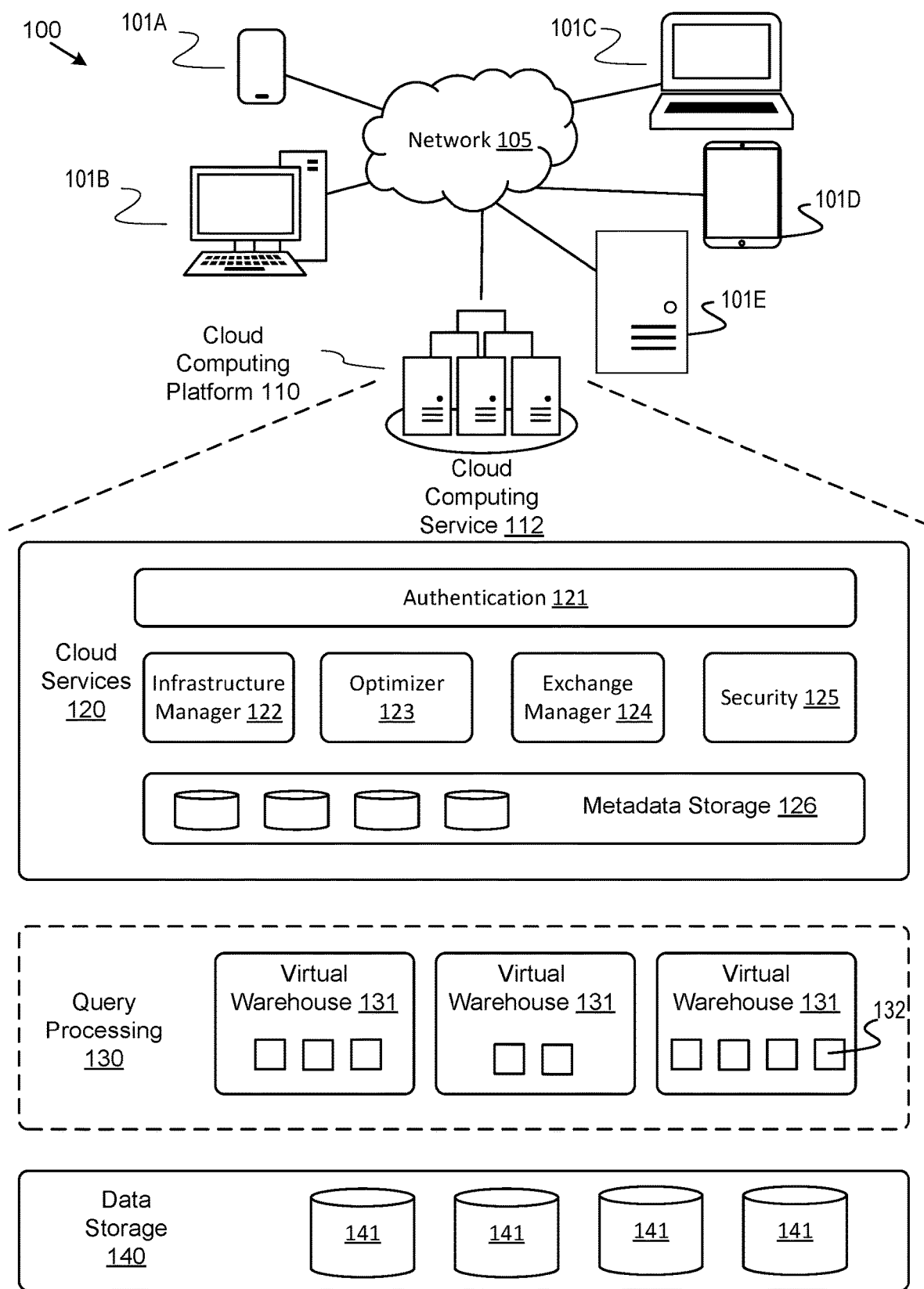
FIG. 1 is a block diagram depicting an example computing environment in which the methods disclosed herein may be implemented.

Databases are widely used for data storage and access in computing applications. A goal of database storage is to provide enormous sums of information in an organized manner so that it can be accessed, managed, and updated. In some embodiments of a database, data may be organized into rows, columns, and tables. Different database storage systems may be used for storing different types of content, such as bibliographic, full text, numeric, and/or image content. Further, in computing, different database systems may be classified according to the organization approach of the database. There are many different types of databases, including relational databases, distributed databases, cloud databases, object-oriented databases, and others.

Queries can be executed against database data to find certain data within the database and respond to a question about the database data. A database query extracts data from the database and formats it into a readable form. For example, when a user wants data from a database, the user may write a query in the language required by the database. The query may request specific information from the database. For example, if the database includes information about sales transactions made by a retail store, a query may request all transactions for a certain product during a certain time frame. The query may request any pertinent information that is stored within the database. If the appropriate data can be found to respond to the query, the database has the potential to reveal complex trends and activities.

However, when a database becomes very large and includes vast sums of data, it can be very difficult to respond to a database query. Further to the above example, if the database includes a record of all sales transactions for the retail store over an extensive time period, the database may include multiple tables that each include billions of rows of information divided into hundreds or thousands of columns. If a user requests all transactions for a certain product across the entire history of the database, it can require extensive computing resources and time to scan the entire database to find each of the requested transactions.

Databases may further include metadata, or information about the database data, to aid in organizing the database and responding to queries on the database. Metadata is data information that provides information about other data. For example, metadata about an image file may include information such as the date and time the image was captured, the camera that captured the image, the camera settings when the image was captured, a file size of the image, a name of the image, and so forth. Further for example, metadata about a table in a database may include information such as the minimum value in the table, the maximum value in the table, the number of rows in the table, the number of columns in the table, the type of data stored in the table, the subject of the data stored in the table, and so forth.

Metadata can be useful for responding to a database query. For example, metadata may be helpful in performing various types of performance enhancements for queries. One such enhancement is pruning. Pruning is described, for example, in U.S. Pat. No. 10,437,780, entitled "Data pruning based on metadata," the entire contents of which are incorporated herein by reference. In some embodiments of data pruning, the predicates of a database query are examined to determine the ranges and/or types of data being queried. Metadata for the data stored in the table may then be used to rule out certain portions of the data storage from being scanned. By reducing the amount of data being scanned, the overall performance of the database will improve.

Pruning can be a very important part of query compilation in complex databases, such as those described herein. However, particularly in the context of a large database, the metadata itself can become very large and require extensive computing resources and time to just scan the metadata without scanning any of the database data. In certain implementations it can be useful to employ an organized and efficient metadata structure. With multi-level metadata, a database can effectively have metadata about groups of metadata. In such a hierarchical structure, higher level metadata may be queried before lower level metadata, which may allow for less of the metadata to be loaded.

However, even with such multi-level metadata, additional improvements may still be made. By aligning the groups of the metadata with underlying organization strategies of the database tables, such as data clustering, additional improvements to the metadata grouping may be achieved. Described herein are systems, methods, and computer program products that intelligently organize groups of metadata so as to reduce the amount of metadata that is loaded when query pruning and other types of database management are performed. Methods described herein reduce the amount of memory utilized for query compilation and allow for fewer resources to be used to perform other database tasks such as data compaction.

FIG. 1 is a block diagram of an example computing environment 100 in which the systems and methods disclosed herein may be implemented. In particular, a cloud computing platform 110 may be implemented, such as AMAZON WEB SERVICES™ (AWS), MICROSOFT AZURE™, GOOGLE CLOUD™ or GOOGLE CLOUD PLATFORM™, or the like. As known in the art, a cloud computing platform 110 provides computing resources and storage resources that may be acquired (purchased) or leased and configured to execute applications and store data. The cloud computing platform 110 may be accessed by a client 101 (e.g., a client device). Non-limiting examples of client devices include a smart phone 101A, personal computer 101B, laptop 101C, tablet computer 101D, server computer 101E, and/or another type of device that can process data.

FIG. 1 and the other figures may use like reference numerals to identify like elements. A letter after a reference numeral, such as "101A," indicates that the text refers specifically to the element having that particular reference numeral. A reference numeral in the text without a following letter, such as "101," refers to any or all of the elements in the figures bearing that reference numeral.

In some embodiments, client devices 101 may access the cloud computing platform 110 over a network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WIFI® hotspot connected with the network 105 and/or a wireless carrier system that can be implemented using various data processing equipment, communication towers (e.g., cell towers), etc. The network 105 may carry communications (e.g., data, message, packets, frames, etc.) between the various components of the cloud computing platform 110 and one more of the client devices 101.

The cloud computing platform 110 may host a cloud computing service 112 that facilitates storage of data on the cloud computing platform 110 (e.g., data management and access) and analysis functions (e.g., SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as AMAZON S3 to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of metadata, temp data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution by compute nodes within elastic clusters of virtual machines, referred to herein as virtual warehouses or data warehouses. Thus, query processing 130 may include one or more virtual warehouses 131 having one or more compute nodes 132, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse 131 that expands, contracts, or shuts down according to the user's needs. Expanding a virtual warehouse 131 involves generating one or more compute nodes 132 to the virtual warehouse 131. Contracting a virtual warehouse 131 involves removing one or more compute nodes 132 from the virtual warehouse 131. More compute nodes 132 may lead to faster compute times. For example, a data load which takes fifteen hours on a system with four nodes might take only two hours with thirty-two nodes.

Cloud services 120 may be a collection of services (e.g., computer instruction executing on a processing device) that coordinate activities across the cloud computing service 112. These services tie together all of the different components of the cloud computing service 112 in order to process user requests, from login to query dispatch. Cloud services 120 may operate on compute instances provisioned by the cloud computing service 112 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, authentication engine 121, infrastructure manager 122, optimizer 123, exchange manager 124, security engine 125, and metadata storage 126. Though metadata storage 126 is illustrated as being separate from the data storage 140 in FIG. 1, this is merely for schematic purposes and is not intended to limit the present disclosure. In some embodiments, the metadata storage 126 is co-located with the data storage 140.

In one embodiment, the cloud computing service 112 can perform, or cause to be performed, data management operations on the data storage 140. In some embodiments, the data management operations may include the generation of metadata for data of the data storage 140. In some embodiments, multiple levels of metadata may be formed, one level of the metadata containing metadata values for a group of metadata in another level of the metadata. In some embodiments, the groups of the metadata may be organized at least partially based on data organization metrics of the data storage 140. For example, in some embodiments, the groups of the metadata may be organized at least partially based on a clustering key of the data storage 140.

Figure 2:
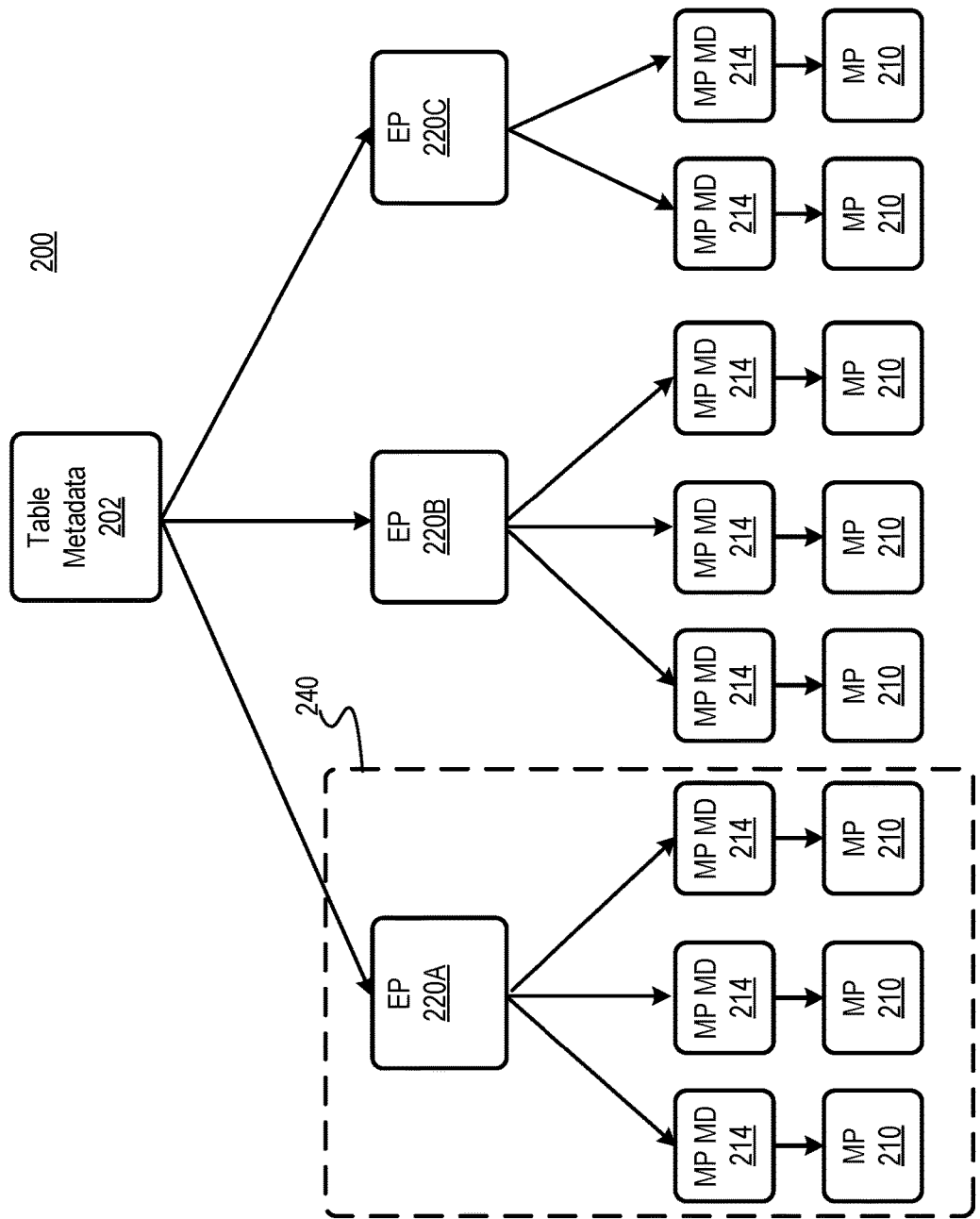
FIG. 2 is a schematic diagram of a data structure for storage of database metadata, according to some embodiments of the present disclosure.

FIG. 2 is a schematic diagram of a data structure 200 for storage of database metadata, according to some embodiments of the present disclosure. The data structure 200 includes table metadata 202 pertaining to database data stored across a table of the database. The table may be composed of multiple micro-partitions (MP) 210. Each of the multiple micro-partitions 210 may include numerous rows and columns making up cells of database data.

In some embodiments, the plurality of micro-partitions 210 of the table may be provided as immutable storage devices. When a transaction is executed on such a table, all impacted micro-partitions 210 are recreated to generate new micro-partitions 210 that reflect the modifications of the transaction. After a transaction is fully executed, any original micro-partitions 210 that were recreated may then be removed from the database. In some embodiments, a new version of the table is generated after each transaction that is executed on the table. The table may undergo many versions over a time period if the data in the table undergoes many changes, such as inserts, deletes, updates, and/or merges.

The table metadata 202 may include global information about the table of a specific version. In some embodiments, the table metadata 202 may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a data manipulation language (DML) statement such as an insert, delete, merge, and/or update command. Each time a DML statement is executed on the table, and a new table version is generated, one or more new micro-partitions 210 may be generated that reflect the DML statement.

The data structure 200 further includes micro-partition metadata (MP MD) 214 (also referred to herein as a micro-partition metadata file 214) that includes metadata about a micro-partition 210 of the table. In some embodiments, each of the micro-partition metadata 214 may include information about at least one respective micro-partition 210 of the table. The micro-partitions 210 illustrated in FIG. 2 may include database data that is separate from the metadata storage. In some embodiments, the micro-partition metadata 214 may be stored for each column of each micro-partition 210 of the table. The micro-partition metadata 214 pertaining to a particular micro-partition 210 may include any suitable information about data of a portion of the table (e.g., a column) stored in the micro-partition 210, including for example, a minimum and maximum for the data stored in a portion of the database (e.g., a column), a type of data stored in the portion of the database, a subject of the data stored in the portion of the database, versioning information for the data stored in the portion of the database, file statistics for all micro-partitions 210 in the table, global cumulative expressions for columns of the table, and so forth. Each column of each micro-partition 210 of the table may be associated with one or more micro-partition metadata elements 214. As illustrated in the example embodiment shown in FIG. 2, the table metadata 202 includes micro-partition metadata 214 for each micro-partition 210. However, the embodiments of the present disclosure are not limited thereto. It should be appreciated that the table may include any number of micro-partitions 210 and any number of micro-partition metadata 214, and each micro-partition 210 may include any number of columns. The micro-partitions 210 may have the same or different columns and may have different types of columns storing different information.

The data structure 200 further includes a plurality of expression property files (EP or EP files) 220A, 220B, and 220C (which may be collectively referenced herein as EP files 220). The EP files 220 may include aggregated micro-partition statistics, cumulative column properties, and so forth about a micro-partition 210 or a collection of micro-partitions 210 of the table. A micro-partition metadata file 214 may be stored for each column of each micro-partition 210 of the table, and an EP file 220 may be stored for a collection of micro-partition metadata files 214 associated with a plurality of micro-partitions 210 of the table as illustrated in FIG. 2.

The data structure 200 may include micro-partition metadata 214 for each micro-partition 210 of the table. The micro-partition metadata 214 may include a minimum/maximum data point for the corresponding micro-partition 210, a type of data stored in the corresponding micro-partition 210, a micro-partition structure of the corresponding micro-partition 210, and so forth. The micro-partition metadata 214 may be stored as part of a micro-partition that is allocated for metadata (e.g., as opposed to data of the database). A micro-partition allocated for metadata may be persisted in immutable storage and the EP files 220 may also be stored within the metadata micro-partition in immutable storage. A metadata manager may maintain all metadata micro-partitions, including metadata micro-partitions comprising the EP files 220 and/or the micro-partition metadata 214.

The cumulative table metadata 202 may include global information about all micro-partitions 210 within the applicable table. For example, the cumulative table metadata 202 may include a global minimum and global maximum for the entire table, which may include millions or even hundreds of millions of micro-partitions 210. The cumulative table metadata 202 may include any suitable information about the data stored in the table, including, for example, minimum/maximum values, null count, a summary of the database data collectively stored across the table, a type of data stored across the table, a distinct version for the data stored in the table, and so forth.

The EP files 220A-220C may include information about database data stored in an associated grouping 240 of micro-partitions 210. In the example of FIG. 2, an example EP file 220A is associated with a grouping 240 of three micro-partition metadata 214 that are respectively associated with three micro-partitions 210. The example EP file 220A may include information about those three different micro-partitions 210. An EP file 220 may include any suitable information about the grouping 240 of the micro-partitions 210 and/or micro-partition metadata 214 with which it is associated. For example, an EP file 220 may include a cumulative minimum/maximum for the collective grouping 240 of micro-partitions 210, a minimum/maximum for each of the micro-partitions 210 within the grouping 240, a cumulative null count, a null count for each of the micro-partitions 210 within the grouping 240, a cumulative summary of data collectively stored across the grouping 240 of micro-partitions 210, a summary of data stored in each of the micro-partitions 210 in the grouping 240, and so forth.

The EP files 220 illustrated in FIG. 2 provide valuable cumulative metadata pertaining to a collection of micro-partition metadata 214 and micro-partitions 210 of the database. Further, each of the micro-partition metadata 214 provide valuable information about respective ones of the micro-partitions 210 of the table.

Figure 3:
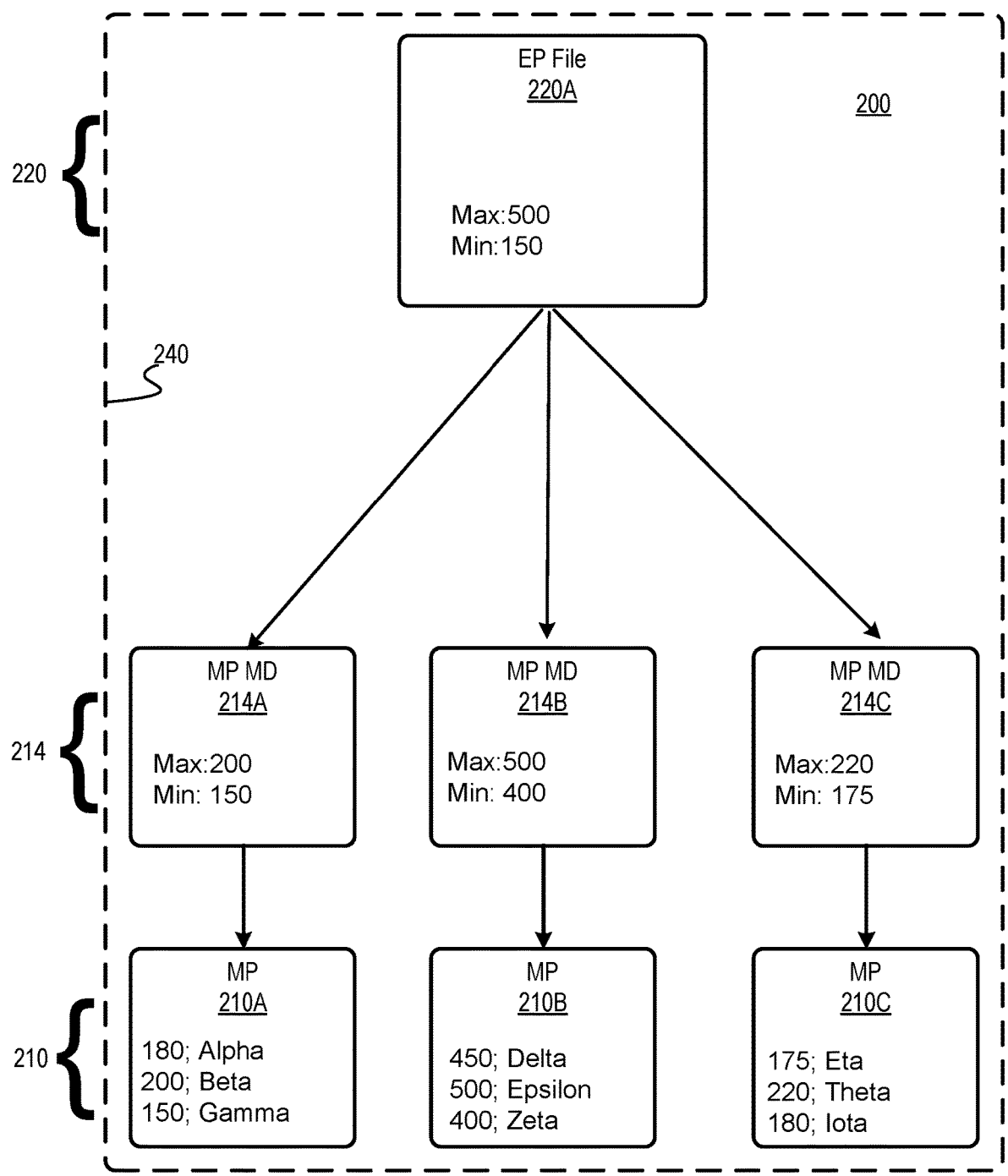
FIG. 3 illustrates an example grouping of micro-partitions, micro-partition metadata, and EP files of FIG. 2, according to some embodiments of the present disclosure.

FIG. 3 illustrates an example grouping 240 of micro-partitions 210, micro-partition metadata 214, and EP files 220 of FIG. 2, according to some embodiments of the present disclosure. The grouping 240 is an example to illustrate the EP files 220, and is not intended to limit the embodiments of the present disclosure.

Referring to FIG. 3, the data structure 200 may include grouping 240 of micro-partitions 210. More specifically, the example grouping 240 may include micro-partition 210A, micro-partition 210B, and micro-partition 210C (referred to collectively as micro-partitions 210). Each of the micro-partitions may be respectively associated with a micro-partition metadata file 214. For example, micro-partition metadata file 214A may be associated with micro-partition 210A, micro-partition metadata file 214B may be associated with micro-partition 210B, and micro-partition metadata file 214C may be associated with micro-partition 210C. An EP file 220A may be associated with the micro-partition 210A, micro-partition 210B, and micro-partition 210C, as well as their associated micro-partition metadata files 214 (e.g., micro-partition metadata files 214A, 214B, 214C).

As described herein, the micro-partitions 210 may contain one or more portions of data from a database. For example, the micro-partitions 210 may contain one or more columns and/or rows from a table of the database. Example data is provided in FIG. 3 to aid in understanding. For example, micro-partition 210A contains a first column including data elements 180, 200, and 150 along with a second column including data elements "Alpha," "Beta," and "Gamma." Micro-partition 210B contains the first column including data element values 450, 500, and 400 along with the second column including data element values "Delta," "Epsilon," and "Zeta." Micro-partition 210C contains the first column including data element values 175, 220, and 180 along with the second column including data elements "Eta," "Theta," and "Iota." As previously noted, these data values are merely examples and not intended to limit the embodiments of the present disclosure.

Each of the micro-partitions 210 may be associated with at least one micro-partition metadata file 214. The micro-partition metadata file 214 may maintain, in part, metadata describing the data values of the micro-partitions 210. In FIG. 3, an example is shown for metadata of the micro-partition metadata file 214 regarding the maximum (max) and minimum (min) of data of the micro-partition 210. However, as described herein, a number of different types of metadata may be maintained in the micro-partition metadata file 214. For example, the metadata 214 of the micro-partition 210 may include values tracking null values of the data of the micro-partition 210, length of the data, and so on.

In the example of FIG. 3, micro-partition metadata file 214A is associated with micro-partition 210A. The metadata of the micro-partition metadata file 214A tracks that the maximum (max) of the data of the first column of the micro-partition 210A is 200 and the minimum (min) of the data of the first column of the micro-partition 210A is 150. Micro-partition metadata file 214B is associated with micro-partition 210B. The metadata of the micro-partition metadata file 214B tracks that the maximum (max) of the data of the first column of the micro-partition 210B is 500 and the minimum (min) of the data of the first column of the micro-partition 210B is 400. Micro-partition metadata file 214C is associated with micro-partition 210C. The metadata of the micro-partition metadata file 214C tracks that the maximum (max) of the data of the first column of the micro-partition 210C is 220 and the minimum (min) of the data of the first column of the micro-partition 210C is 175. The minimum and maximum data values maintained by the respective micro-partition metadata 214 represents a smallest value and a largest value, respectively, of the data for a particular column (e.g., the first column) for a respective micro-partition 210.

The micro-partition metadata files 214A, 214B, and 214C may be associated with an EP file 220. In the example of FIG. 3, micro-partition metadata files 214A, 214B, and 214C are each associated with EP file 220A. The metadata of the EP file 220A tracks that the maximum (max) of the metadata of the first column tracked by the micro-partition metadata files 214A, 214B, and 214C is 500 and the minimum (min) of the metadata of the first column tracked by the micro-partition metadata files 214A, 214B, and 214C is 150. The minimum and maximum data values maintained by the EP file 220 represents a smallest value and a largest value, respectively of the metadata for a particular column (e.g., the first column) for the micro-partition metadata files 214 within the grouping 240.

The use of the micro-partition metadata files 214 and the EP files 220 may increase the efficiency of query processing. For example, as part of data pruning for a query, it may be determined that a particular query utilizes a predicate that restricts data values returned to those in which the first column has a value less than 100. By reviewing the min and max of the EP file 220, it can be determined that none of the micro-partition metadata files 214 associated with the EP file 220 have a data value in the first column that would match this query. Subsequently, the micro-partitions 210 of the grouping 240 may be skipped in a scan of data to find values that should be returned for the query.

As another example, as part of data pruning for a query, it may be determined that a particular query utilizes a predicate that restricts data values returned to those in which the first column has a value less than 200. By reviewing the min and max of the EP file 220, it can be determined that at least one of the micro-partition metadata files 214 associated with the EP file 220 has a data value in the first column that would match this query. Responsive to this determination, the metadata for the micro-partition metadata files 214 associated with the EP file 220 may be examined. From that examination, it can be determined that the micro-partition metadata files 214A and 214C have min and max values indicating that their respective micro-partitions 210 contain data that would match this query. Subsequently, the micro-partition 210B of the grouping 240 may be skipped and the micro-partitions 210A and 210C may be examined in a scan of data to find values that should be returned for the query.

The data structure 200 shown in FIGS. 2 and 3 increases efficiency when responding to database queries. A database query may request any collection of data from the database and may be used to create advanced analyses and metrics about the database data. Some queries, particularly for a very large database, can be extremely costly to run both in time and computing resources. When it is necessary to scan metadata and/or database data for each file or micro-partition of each table of a database, it can take many minutes or even hours to respond to a query. In certain implementations this may not be an acceptable use of computing resources. The data structure 200 disclosed herein provides increased metadata granularity and enables multi-level pruning of database data.

During compilation and optimization of a query on the database, a processing device may scan the cumulative table metadata 202 to determine if the table includes information pertaining to the query. In response to determining, based on the cumulative table metadata 202, that the table includes information pertaining to the query, the processing device may scan each of the EP files 220 to determine which grouping of micro-partitions 210 of the table include information pertaining to the query. In response to determining, based on a first EP file 220, that a first grouping 240 of micro-partitions 210 does not include information pertaining to the query, the processing device may discontinue database scanning of that first grouping 240 of micro-partitions 210.

In response to determining, based on a second EP file 220, that a second grouping 240 of micro-partitions 210 includes information pertaining to the query, the processing device may proceed to scan micro-partition metadata files 214 for that second grouping 240 of micro-partitions 210. The processing device may efficiently determine which micro-partitions 210 include pertinent data and which columns of which micro-partitions 210 do not include pertinent data. The processing device may proceed to scan only the relevant column(s) and micro-partition(s) 210 that include information relevant to a database query. This provides a cost efficient means for responding to a database query by way of multi-level pruning based on multi-level table metadata.

Further to increase the cost efficiency of database queries, a resource manager (e.g., cloud services 120 of FIG. 1) may store the cumulative table metadata 202 in a cache for faster retrieval. Metadata for the database may be stored in a metadata store separate and independent of a plurality of shared storage devices collectively storing database data. In some embodiments, metadata for the database may be stored within the plurality of shared storage devices collectively storing database data. In some embodiments, metadata may be stored in metadata-specific micro-partitions that do not include database data, and/or may be stored within micro-partitions that also include database data. The metadata may be stored across disk storage, such as the plurality of shared storage devices, and it may also be stored in cache within the resource manager.

Figure 4:
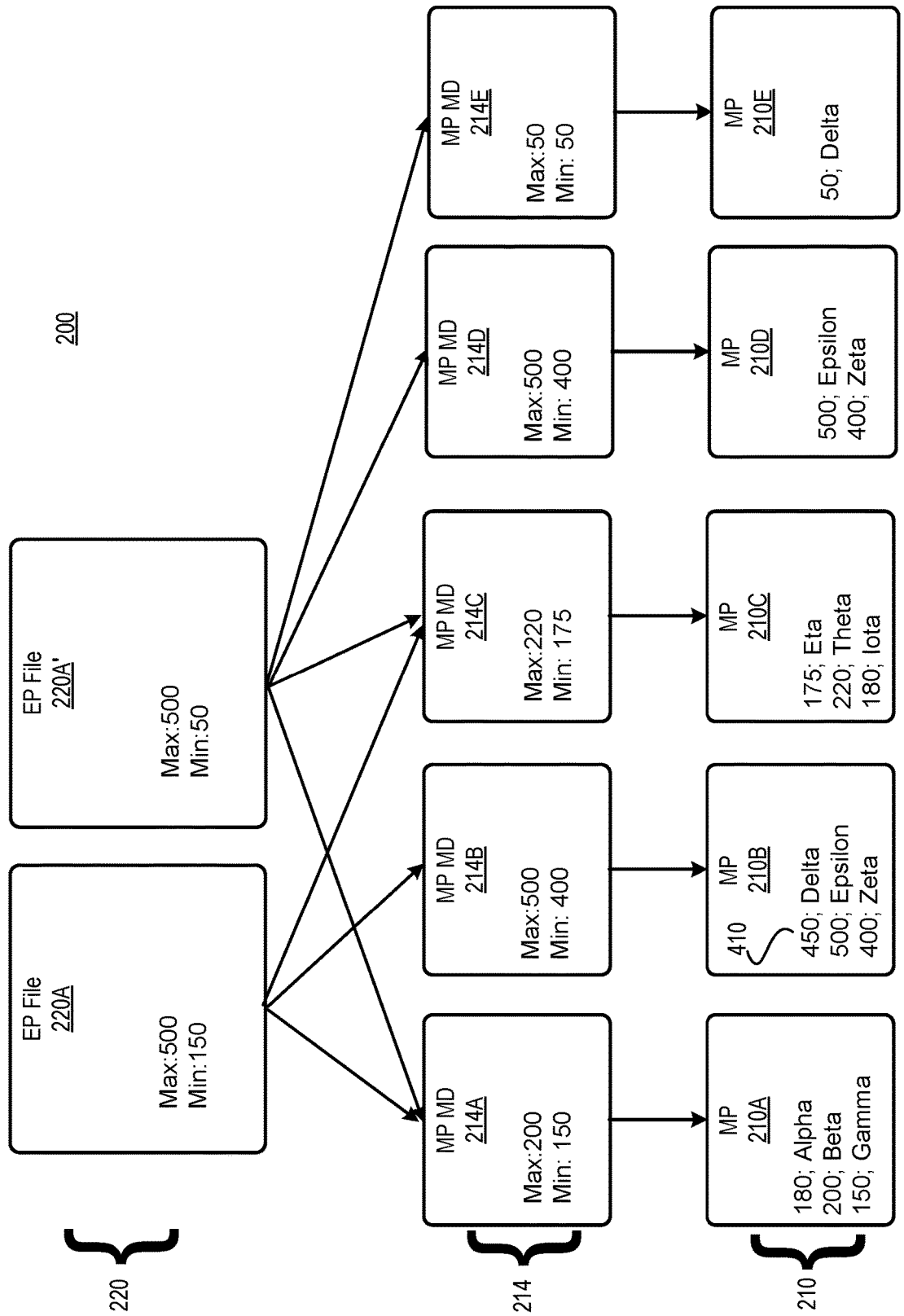
FIG. 4 illustrates an example modification of a micro-partition, according to some embodiments of the present disclosure.

Though the use of multi-level metadata may provide benefits, it may still introduce challenges. For example, the generation of the groupings 240 may be made in a naive manner. For example, as new micro-partitions 210 are created (along with new micro-partition metadata files 214), they may be grouped based on time of creation and/or registration. This may result in configurations that are sub-optimal. FIG. 4 illustrates an example modification of a micro-partition 210, according to some embodiments of the present disclosure.

The example of FIG. 4 illustrates a scenario in which the micro-partition metadata 214 and the micro-partitions 210 are stored in immutable storage. In such a scenario, a modification to data within a micro-partition 210 may result in the formation of a new micro-partition 210 rather than an in-situ modification of the current micro-partition 210 containing the data. Though the example of FIG. 4 concerns immutable storage, the embodiments of the present disclosure are not limited to such a configuration.

In the example of FIG. 4, it is assumed that a data modification is performed to the data of micro-partition 210B (e.g., as a result of a DML transaction). For example, the data of the first column that previously had a value of 450 (illustrated by reference number 410) may be changed to have a value of 50. In such a scenario, new micro-partitions 210D and 210E may be created.

For example, micro-partition 210D contains a first column including data element values 500 and 400 along with a second column including data elements "Epsilon" and "Zeta." The data of micro-partition 210D may be the data from the original micro-partition 210B that has been moved, e.g., due to the immutability of micro-partition 210B. Micro-partition 210E contains the first column including data element 50 along with the second column including the data element "Delta." The data of micro-partition 210E may be the data from the original micro-partition 210B that has been updated, e.g., due to the immutability of micro-partition 210B. In some embodiments, two new micro-partitions 210D, 210E may be created rather than forming a single new micro-partition 210 for a number of potential reasons. For example, as will be discussed further herein, the data of the micro-partitions 210 may be organized based on clustering keys associated with the data.

Each of the new micro-partitions 210D, 210E will each be associated with a micro-partition metadata file 214. For example, micro-partition metadata 214D is associated with micro-partition 210D. The metadata of the micro-partition metadata 214D tracks that the maximum (max) of the data of the first column of the micro-partition 210D is 500 and the minimum (min) of the data of the first column of the micro-partition 210D is 400. Micro-partition metadata 214E is associated with micro-partition 210E. The metadata of the micro-partition metadata 214E tracks that the maximum (max) of the data of the first column as well as the minimum (min) of the data of the first column of the micro-partition 210E is 50.

The micro-partition metadata files 214D, 214E may also be associated with EP file 220A'. Due to the update of the data that resulted in the formation of the new micro-partition 210E, the minimum (min) of the metadata tracked by the micro-partition metadata file 214E may now be 50. The EP file 220A' may either be an updated form of the previous EP file 220A, or may be a new EP file 220A' formed due to the EP file 220A being formed in immutable storage. The updated EP file 220A' may include micro-partition metadata files 214A, 214C, 214D, and 214E.

The update of the minimum value of the EP file 220A' to 50 now means that the minimum and maximum values of the EP file 220A' cover a much larger range. As a result of covering a much larger range, the efficiency of the pruning may be impacted because the pruning may not be able to deselect as many micro-partition metadata files 214 (and their associated micro-partitions 210) for scanning. For example, in the prior-discussed scenario in which a predicate of a query selected data based on the data of the first column being less than 100, pruning would allow all of the micro-partitions 210 to be skipped in the example of FIG. 3. With this update to the data, the same query will now require all of the micro-partition metadata 214 to be scanned, despite the fact that only one of the micro-partitions 210, micro-partition 210E, meets this predicate.

In some embodiments, since the data represented by the micro-partitions 210 may include different types of data having different values, clustering may be performed based on metadata associated with a particular data value and/or values of the micro-partitions 210. For example, in some embodiments, the metadata that is used for determining membership in an EP file 220 may be based on a clustering key used to organize the micro-partitions 210. A clustering key is a subset of columns in a table (or expressions on a table, such as SQL expressions) that are designated to co-locate the data in the table in the same micro-partitions 210. When specified, the clustering key may be utilized to identify portions of the table which are to be used for making decisions about which data to co-locate within a micro-partition 210. For example, if a particular column of a table is identified as a clustering key, values of the data of that particular column may be utilized to identify rows of the table that are to be co-located in a same micro-partition 210. For example, rows of the table having values of the first particular column that are relatively close to one another (e.g., within a threshold numeric distance if the first column is a numeric value) may be located in a same micro-partition 210. In some embodiments, the clustering key may be specified by the administrator, such as when a database table is created. In some embodiments, the clustering keys that are utilized to co-locate data in micro-partitions 210 may also be utilized for determining the membership in EP files 220. Clustering keys, as well as clustering in general, are discussed in U.S. Pat. No. 10,817,540, entitled "Incremental clustering maintenance of a table," the entire contents of which are incorporated herein by reference.

In some embodiments, to avoid and/or reduce issues in which the EP files 220 and/or the micro-partitions 210 cover large ranges, rendering pruning inefficient, the EP files 220 and/or the micro-partitions 210 may be re-clustered (e.g., periodically). Clustering may include reorganizing the data of the EP files 220 and/or the micro-partitions 210 to form EP files 220 and/or the micro-partitions 210 that cover smaller ranges. In a system in which the EP files 220 and/or the micro-partitions 210 are stored in immutable storage, clustering may include forming new EP files 220 and/or new micro-partitions 210 having different data and/or micro-partition metadata 214, as described, for example, with respect to FIG. 4.

In some embodiments, the selection of micro-partitions 210 for clustering members of an EP file 220 may be performed based on how well-clustered the EP files 220 of the database are determined to be. A table may be defined as clustered based on a certain order-preserving function which takes data in each row as input if rows that are close in evaluation of this function are also close together in their physical ordering. The degree of clustering (clustering ratio) of a table may be determined by the proportion of rows in the physical layout of the table that satisfy such ordering criteria. Perfect clustering is achieved when for any two rows in the table that are adjacent in their physical layout, no third row can be found that yields a closer distance to both rows according to the ordering function. For tables stored as micro-partitions 210, clustering improves the probability that rows closer according to the ordering function should reside in the same micro-partition 210.

In some embodiments, the micro-partitions 210 may be scanned to determine if the clustering ratio may be improved and, if so, clustering may be performed on the micro-partitions 210. If the micro-partitions 210 are stored in immutable storage, the clustering of the micro-partitions 210 may involve the deletion and recreation of micro-partitions 210. When the micro-partitions 210 are recreated, they may be associated with micro-partition metadata files 214, which may subsequently be organized into EP files 220, as described herein.

In a similar manner, the EP files 220 may be scanned to determine if the clustering ratio of the metadata range encompassed by the EP file 220 may be improved. If so, the members of the EP file 220 may be re-clustered. The clustering of the EP file 220 may involve the movement of assignments of micro-partition metadata files 214 between EP files 220. For example, a micro-partition metadata file 214 may be removed from one EP file 220 to another EP file 220. In some embodiments, selection of micro-partition metadata files 214 for membership in an EP file 220 may be performed in a similar matter as described herein (e.g., based on a metadata range for a data value, such as a clustering key, and/or a time of creation/registration). If the EP files 220 are stored in immutable storage, the clustering of the EP files 220 may involve the deletion and recreation of EP files 220. In some embodiments, an improvement to the clustering quality of the micro-partitions 210 may also involve the deletion and recreation of the micro-partitions 210, which may cause the EP files 220 to be modified based on modifications to the underlying micro-partitions 210.

Clustering the EP files 220 and/or the micro-partitions 210 may be performed by looking at how storage of a clustering key is represented within the EP files 220 and/or the micro-partitions 210 and reforming the EP files 220 and/or the micro-partitions 210 to more closely locate values of the clustering keys stored in the micro-partitions 210 within a same EP file 220 and/or the micro-partition 210. In a theoretical scenario, all of the micro-partitions 210 of a given database could be analyzed during clustering, and new micro-partitions 210 formed in which values of the clustering key that were close to one another within a data range were also clustered within a same micro-partition 210. New micro-partition metadata 214 could then be formed for the data ranges of the new micro-partitions 210, and new EP files 220 could be formed based on the new micro-partition metadata 214. However, in a practical sense, analysis of all of the micro-partitions 210 and/or micro-partition metadata 214 may take an unreasonable amount of time and/or computing resources. For example, to understand how the different ranges of the clustering key are stored across large numbers of micro-partitions 210, large amounts of data may be cached, which may make such an analysis impractical. Moreover, if all of the micro-partitions 210 are potentially re-clustered, it may set up a scenario in which a large number of the EP files 220 associated with the micro-partitions 210 are also re-clustered due to the changes in the micro-partitions 210. This may cause extensive churn within the database and negatively affect performance.

Embodiments of the present disclosure arise, at least in part, from a recognition that clustering may be improved by selectively analyzing a subset of the micro-partitions 210 for clustering. By focusing clustering on micro-partitions 210 that are more likely to have overlapping values (e.g., with respect to the data values of a clustering key) micro-partitions 210 may be selected that have a high potential of providing improvements to the clustering of the data storage. Embodiments according to the present disclosure may be far more memory efficient and may reduce churn across the entire table, which can affect query performance when EP files 220 are to be reloaded into the cache. By selecting micro-partitions 210 from a subset of EP files 220, a number of the EP files 220 that are to be reloaded may be limited, and this may also improve the efficiency of clustering of the micro-partitions 210 because it may reduce the amount of work associated with the clustering and allow the clustering of the micro-partitions 210 to converge.

Embodiments of the present disclosure may improve an operation of the computer by reducing an amount of memory and/or processing resources utilized to provide a database operation. Moreover, embodiments of the present disclosure may improve the technology associated with databases and database processing by providing a more effective mechanism to cluster data within the database storage and, thereby, improve an efficiency and/or speed of a data query (e.g., via pruning).

It may be understood that the clustering of the EP files 220 may be independent of a clustering of the micro-partitions 210. For example, in some embodiments, a clustering ratio of the micro-partitions 210 may be at least partially independent of the clustering ratio of the EP file 220. For example, in some embodiments, clustering of the EP files 220 may be performed regardless of a clustering state of the micro-partitions 210. In some embodiments, clustering of the micro-partitions 210 may be performed regardless of a clustering state of the EP files 220.

In some embodiments, clustering of the micro-partitions 210 may be performed based on one or more clustering statistics of the EP files 220 and/or the micro-partition metadata files 214 of the micro-partitions 210. Statistics that may be used to determine a clustering level of an EP file 220 may include: a number of micro-partitions 210 per micro-partition metadata file 214; an average depth and overlap per micro-partition metadata file 214; an average depth and overlap for the micro-partition metadata files 214 of the EP file 220; a maximum depth and/or overlap per micro-partition metadata file 214; a maximum depth and/or overlap for the micro-partition metadata files 214 of the EP file 220; a median depth and/or overlap per micro-partition metadata file 214; a median depth and/or overlap for the micro-partition metadata files 214 of the EP file 220; a distribution (e.g., a percentile) of the depth and/or overlap for the micro-partition metadata files 214; a distribution (e.g., a percentile) of the depth and/or overlap for the micro-partition metadata files 214 of the EP file 220; and/or an average range of the EP file 220. The depth for a micro-partition 210 may be the maximum number of intersected micro-partitions 210 at any given range. The overlap for a particular micro-partition 210 is the total number of other micro-partitions 210 intersected with the particular micro-partition 210. A first micro-partition 210 may overlap a second micro-partition 210 if the data values between the minimum and maximum data values (e.g., of the clustering key) of the first micro-partition 210 intersect the data values between the minimum and maximum data values (e.g., of the clustering key) of the second micro-partition intersection 210. The above characteristics are merely examples, and not intended to limit the embodiments of the present disclosure.

Figure 5:
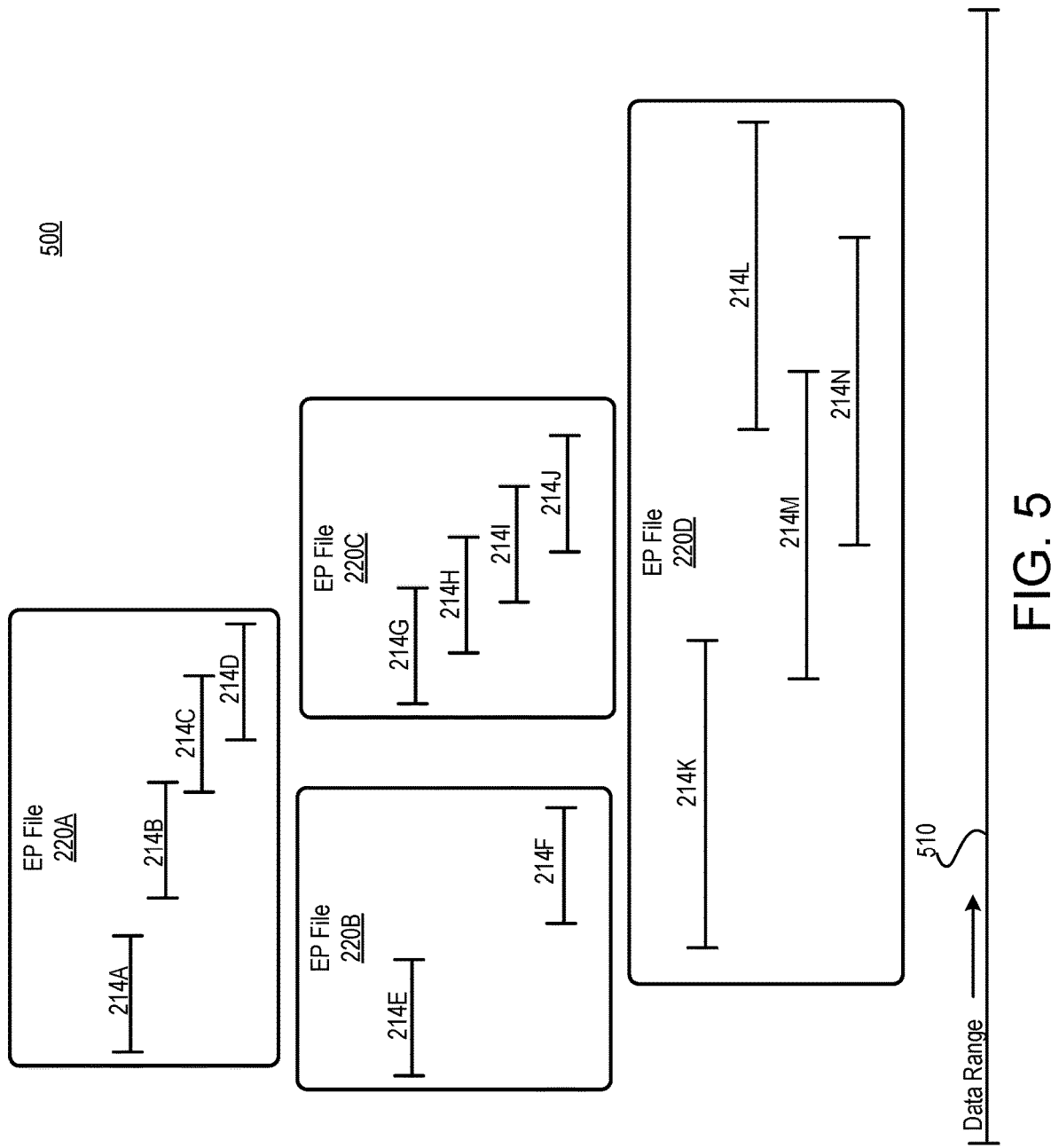
FIG. 5 is a block diagram illustrating techniques for the selection of micro-partitions for clustering, according to some embodiments of the present disclosure.

FIG. 5 is a block diagram illustrating techniques for the selection of micro-partitions 210 for clustering, according to some embodiments of the present disclosure. A description of elements of FIG. 5 that have been previously described will be omitted for brevity. The data structures of FIG. 5 are for the purposes of an example, and are not intended to limit the embodiments of the present disclosure.

In some embodiments, the selection of the micro-partition metadata files 214 and/or EP files 220 may be performed based on an average depth and an overlap of the micro-partition metadata files 214 and/or EP files 220. Once selected for clustering, a given micro-partition metadata file 214 and/or EP file 220 may be recreated and/or reorganized according to embodiments described herein. For example, a selection of data for membership in a micro-partition 210 and/or a selection of micro-partition metadata files 214 and their associated micro-partitions 210 for membership in an EP file 220 during clustering may be performed in a similar matter as described herein (e.g., based on a metadata range for a data value, such as a clustering key).

FIG. 5 illustrates an example of a data structure 500 having a plurality of EP files 220, each having micro-partition metadata 214, as described herein. In some embodiments, each of the micro-partition metadata files 214 may respectively represent a micro-partition 210. However, for purposes of description, only the micro-partition metadata files 214 and the EP files 220 are illustrated in FIG. 5. For example, the data structure 500 may include a first EP file 220A, a second EP file 220B, a third EP file 220C, and a fourth EP file 220D. The first EP file 220A may include a first micro-partition metadata file 214A, a second micro-partition metadata file 214B, a third micro-partition metadata file 214C, and a fourth micro-partition metadata file 214D. The second EP file 220B may include a fifth micro-partition metadata file 214E and a sixth micro-partition metadata file 214F. The third EP file 220C may include a seventh micro-partition metadata file 214G, an eighth micro-partition metadata file 214H, a ninth micro-partition metadata file 214I, and a tenth micro-partition metadata file 214J. The fourth EP file 220D may include an eleventh micro-partition metadata file 214K, a twelfth micro-partition metadata file 214L, a thirteenth micro-partition metadata file 214M, and a fourteenth micro-partition metadata file 214N.

In FIG. 5, each of the micro-partition metadata files 214 is illustrated along a representative data range 510. The length of a line associated with each of the micro-partition metadata files 214 is intended to illustrate a given range (e.g., a minimum data value to a maximum data value) for the data values of the clustering key represented by a particular micro-partition metadata file 214 (e.g., the data values of the clustering key stored in the micro-partitions 210 associated with the particular micro-partition metadata file 214). For example, when two of the micro-partition metadata files 214 are illustrated as being overlapping, that is intended to convey that the data ranges (e.g., of the clustering key) covered by the micro-partitions 210 represented by the micro-partition metadata files 214 may overlap. In FIG. 5, the illustrations are shown with respect to the range of the micro-partition metadata files 214, but it will be understood that the micro-partition metadata files 214 also represent micro-partitions 210.

In some embodiments, whether to perform clustering a given EP file 220 and/or micro-partition metadata file 214 may be made based on a calculation of an average depth of the micro-partition metadata files 214 within an EP file 220 and/or an overlap of the EP files 220. However, the embodiments of the present disclosure are not limited to such a configuration.

A depth of a first micro-partition metadata file 214 and/or micro-partition 210 may be defined to be, at any given data point, the maximum number of other micro-partition metadata files 214 within the EP file 220 covering that same data. For a given EP file 220, a depth may be calculated for each micro-partition metadata file 214 (and its associated micro-partition 210) of the EP file 220, and an average depth for the EP file 220 may be calculated based on the calculated depth for each of the member micro-partitions 210. An overlap of a first EP file 220 may be defined to be the number of other EP file 220 whose data ranges overlap the first EP file 220.

Referring to FIG. 5, within the first EP file 220A, the first micro-partition metadata file 214A may have a depth of 1 (e.g., itself). The second micro-partition metadata file 214B may have a depth of 2. The third micro-partition metadata file 214C may have a depth of 2. The fourth micro-partition metadata file 214D may have a depth of 2. The first EP file 220A may have an average depth of 1.75.

Within the second EP file 220B, both the fifth micro-partition metadata file 214E and the sixth micro-partition metadata file 214F may have a depth of 1. The second EP file 220B may have an average depth of 1.

Within the third EP file 220C, each of the seventh micro-partition metadata file 214G, the eighth micro-partition metadata file 214H, the ninth micro-partition metadata file 214I, and the tenth micro-partition metadata file 214J may have a depth of 3. The third EP file 220C may have an average depth of 3.

Within the fourth EP file 220D, the eleventh micro-partition metadata file 214K may have a depth of 2. The twelfth micro-partition metadata file 214L may have a depth of 3. The thirteenth micro-partition metadata file 214M may have a depth of 3. The fourteenth micro-partition metadata file 214N may have a depth of 3. The fourth EP file 220D may have an average depth of 2.75.

In addition to being calculated at a level of the micro-partition metadata file 214, the depth and the overlap may also be calculated at the level of the EP file 220 as well. In some embodiments, the range of the EP files 220 may extend from the minimum value of all of the data ranges of the member micro-partition metadata files 214 of the EP file 220 to the maximum value of all of the data ranges of the member micro-partition metadata files 214 of the EP file 220. Thus, an EP-file-level overlap and an EP-file-level depth may be calculated as well. For example, the EP-file-level overlap for a particular EP file 220 may be calculated as the number of other EP files 220 containing member micro-partition metadata files 214 overlapping the particular EP file 22. In addition, the EP-file-level depth for a particular EP file 220 may be calculated as the maximum number of other EP files 220 covering a same data point within the particular EP file 220.

Referring to FIG. 5, an EP-file-level overlap value of the first EP file 220A may be calculated as 3 and the EP-file-level depth value of the first EP file 220A may be calculated as 3. An EP-file-level overlap of the second EP file 220B may be calculated as 2 and the EP-file-level depth of the second EP file 220B may be calculated as 3. An EP-file-level overlap of the third EP file 220C may be calculated as 2 and the EP-file-level depth of the third EP file 220C may be calculated as 3. An EP-file-level overlap of the fourth EP file 220D may be calculated as 3 and the EP-file-level depth of the fourth EP file 220D may be calculated as 3.

In some embodiments, the average depth of the micro-partition metadata files 214 and the depth and overlap of the EP files 220 may be utilized to select which of the EP files 220 and or micro-partition metadata files 214 (and their associated micro-partitions 210) are to be selected for clustering (e.g., based on a clustering key). As will be described further herein, an average depth of the various micro-partition metadata files 214 of an EP file 220 may be utilized to select a particular target sub-ranges of the data range 510, and EP files 220, and their associated micro-partitions 210, that overlap these ranges may be selected for clustering.

Figure 6:
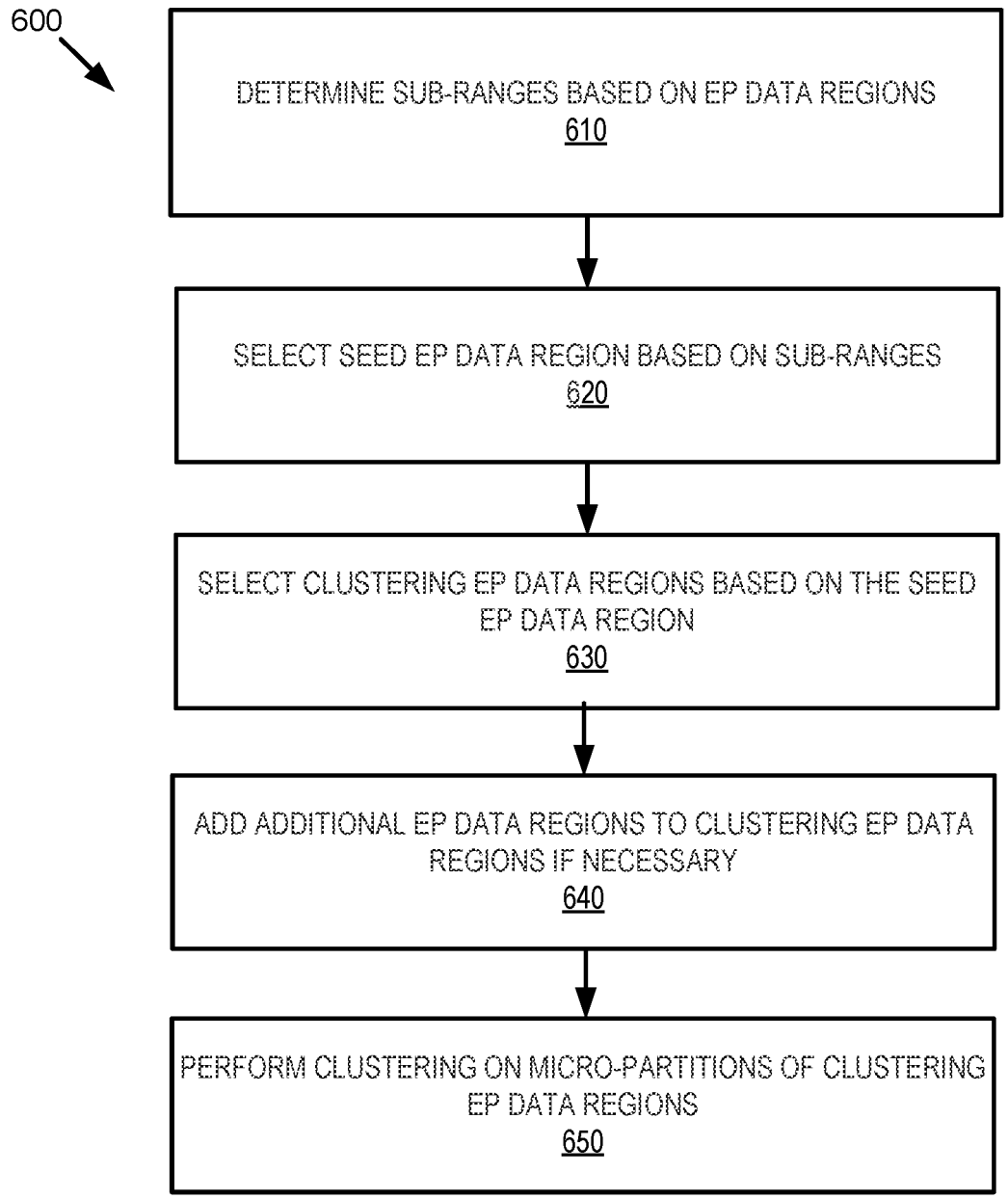
FIG. 6 is a flow diagram of one embodiment of a method for selecting micro-partitions for clustering, according to some embodiments of the present disclosure.

FIG. 6 is a flow diagram of one embodiment of a method 600 for selecting micro-partitions 210 for clustering, according to some embodiments of the present disclosure. In general, the method 600 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Figure 7:
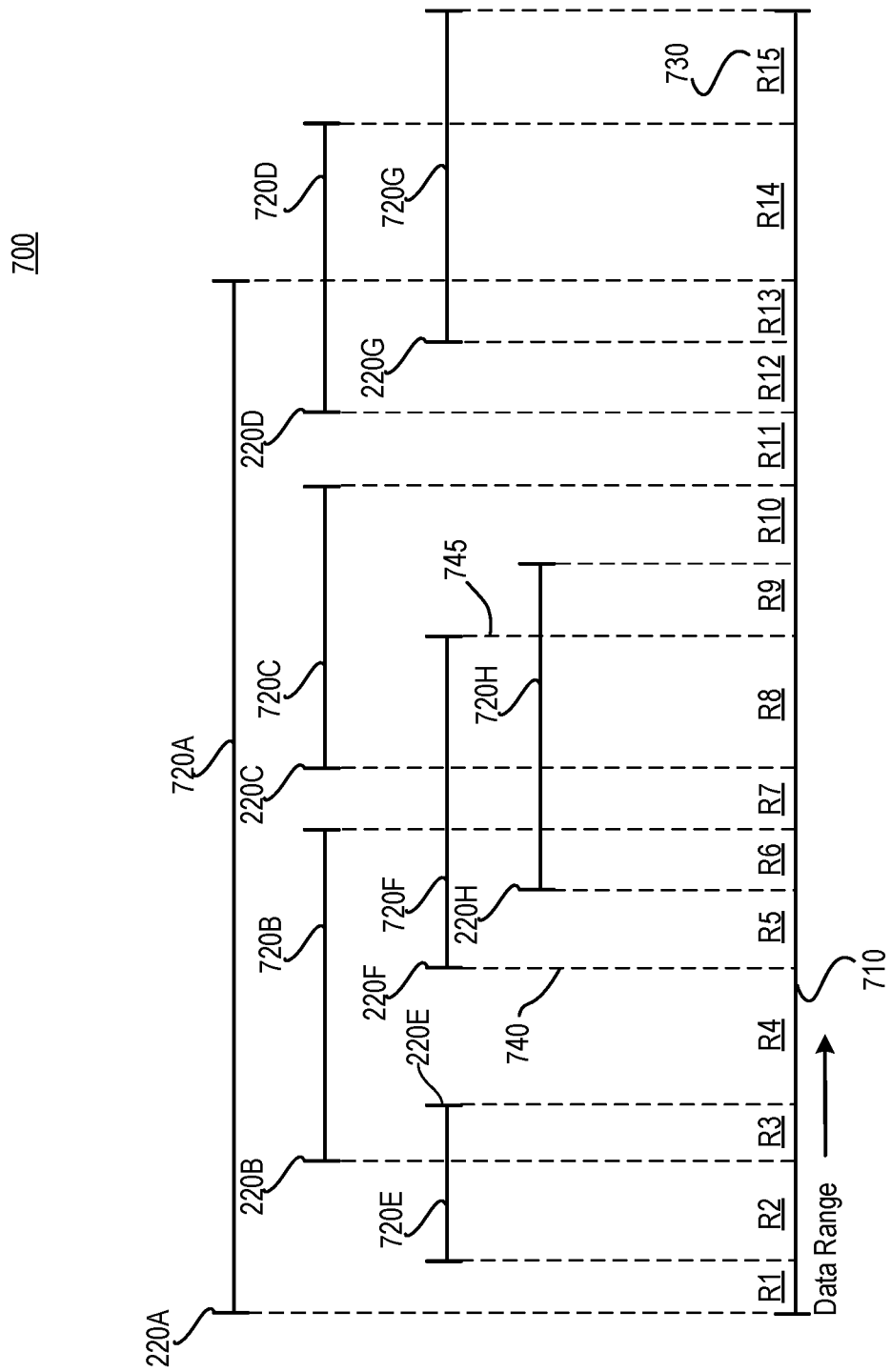
FIG. 7 is a diagram of a data structure illustrating an example scenario of EP files for the selection of micro-partitions for clustering, according to some embodiments of the present disclosure.

The operations of FIG. 6 are described with respect to the data structure of FIG. 7. FIG. 7 is a diagram of a data structure 700 illustrating an example scenario of EP files 220 for the selection of micro-partitions 210 for clustering, according to some embodiments of the present disclosure. The data structure 700 of FIG. 7 illustrates a configuration of EP files 220 whose configuration will be used to provide examples for the operations provided herein. The configuration of FIG. 7 is merely an example, and is not intended to limit the embodiments of the present disclosure. A description of elements of FIG. 7 that have been previously described will be omitted for brevity.

In FIG. 7, a plurality of EP files 220 are illustrated, each having an EP data region 720. The EP files 220 are examples of the EP files 220 similar to those described herein. Thus, each of the plurality of EP files 220 may contain a plurality of micro-partition metadata 214, each corresponding to a micro-partition 210, as described herein. For ease of description, the micro-partition metadata 214 and the micro-partitions 210 are not illustrated in FIG. 7. The EP data region 720 may encompass a range of data values, within the data range 710, between a minimum data value (e.g., of a clustering key) of the micro-partitions 210 of the EP file 220 and a maximum data value (e.g., of the clustering key) of the micro-partitions 210 of the EP file 220.

For example, the data structure 700 may include a first EP file 220A having a first EP data region 720A, a second EP file 220B having a second EP data region 720B, a third EP file 220C having a third EP data region 720C, a fourth EP file 220D having a fourth EP data region 720D, a fifth EP file 220E having a fifth EP data region 720E, a sixth EP file 220F having a sixth EP data region 720F, a seventh EP file 220G having a seventh EP data region 720G, and an eighth EP file 220H having an eighth EP data region 720H. In FIG. 7, each of the EP files 220 is illustrated along a representative data range 710. The length of a line associated with each of the EP files 220 is intended to illustrate a given range (e.g., a minimum data value to a maximum data value) of the EP data region 720 for the data values of the clustering key represented by the micro-partitions 210 of the EP file 220 (e.g., the data values of the clustering key stored in the micro-partitions 210 associated with the particular EP file 220). For example, when two of the EP files 220 are illustrated as having EP data regions 720 that overlap, that is intended to convey that the data ranges (e.g., of the clustering key) covered by the EP files 220 may overlap.

The EP files 220 of FIG. 7 are illustrated in a different configuration than those of FIG. 5 and, as such, will have different metadata. For purposes of the following description, the data structure 700 is presumed to have the following configuration:

TABLE 1

| | 220A/ 720A | 220B/ 720B | 220C/ 720C | 220D/ 720D | 220E/ 720E | 220F/ 720F | 220G/ 720G | 220H/ 720H |
|---|---|---|---|---|---|---|---|---|
| Average Depth | 3 | 7 | 2 | 1 | 3 | 3 | 2 | 2 |
| Number of Micro-partitions | 100 | 400 | 150 | 50 | 200 | 100 | 500 | 100 |

In the table above, values for the average depth and number of micro-partitions 210 are shown for each EP file 220. The average depth for a micro-partition 210 may be calculated as described herein with respect to FIG. 5. The number of micro-partitions 210 may represent the number of micro-partitions 210 (and associated micro-partition metadata files 214) that are grouped within the particular EP file 220.

Referring to FIGS. 6 and 7, method 600 may begin at operation 610, where a plurality of sub-ranges 730 may be determined based on the respective EP data regions 720 of a plurality of EP files 220. To determine the sub-ranges 730, a minimum data value 740 and a maximum data value 745 may be selected for each of the EP data regions 720 of each of the plurality of EP files 220. The minimum data value 740 may represent a minimum value of the data of the micro-partitions 210 of the EP file 220 (e.g., the left side of the EP data region 720). The maximum data value 745 may represent a maximum value of the data of the micro-partitions 210 of the EP file 220 (e.g., the right side of the EP data region 720).

The collections of minimums 740 and maximums 745 may be utilized to delineate sub-ranges 730 within the overall data range 710. For example, a sub-range 730 may be defined between a first minimum value 740 or maximum value 745 and the nearest adjacent minimum value 740 or maximum value 745. Thus, the sub-ranges 730 are the intervals of the data range 710 between adjacent minimum and maximum values 740, 745 of the EP data regions 720. In the example of FIG. 7, fifteen sub-ranges 730 are illustrated. For example, a first sub-range R1, a second sub-range R2, a third sub-range R3, a fourth sub-range R4, a fifth sub-range R5, a sixth sub-range R6, a seventh sub-range R7, an eighth sub-range R8, a ninth sub-range R9, a tenth sub-range R10, an eleventh sub-range R11, a twelfth sub-range R12, a thirteenth sub-range R13, a fourteenth sub-range R14, and a fifteenth sub-range R15 are illustrated in FIG. 7.

Figure 8A:
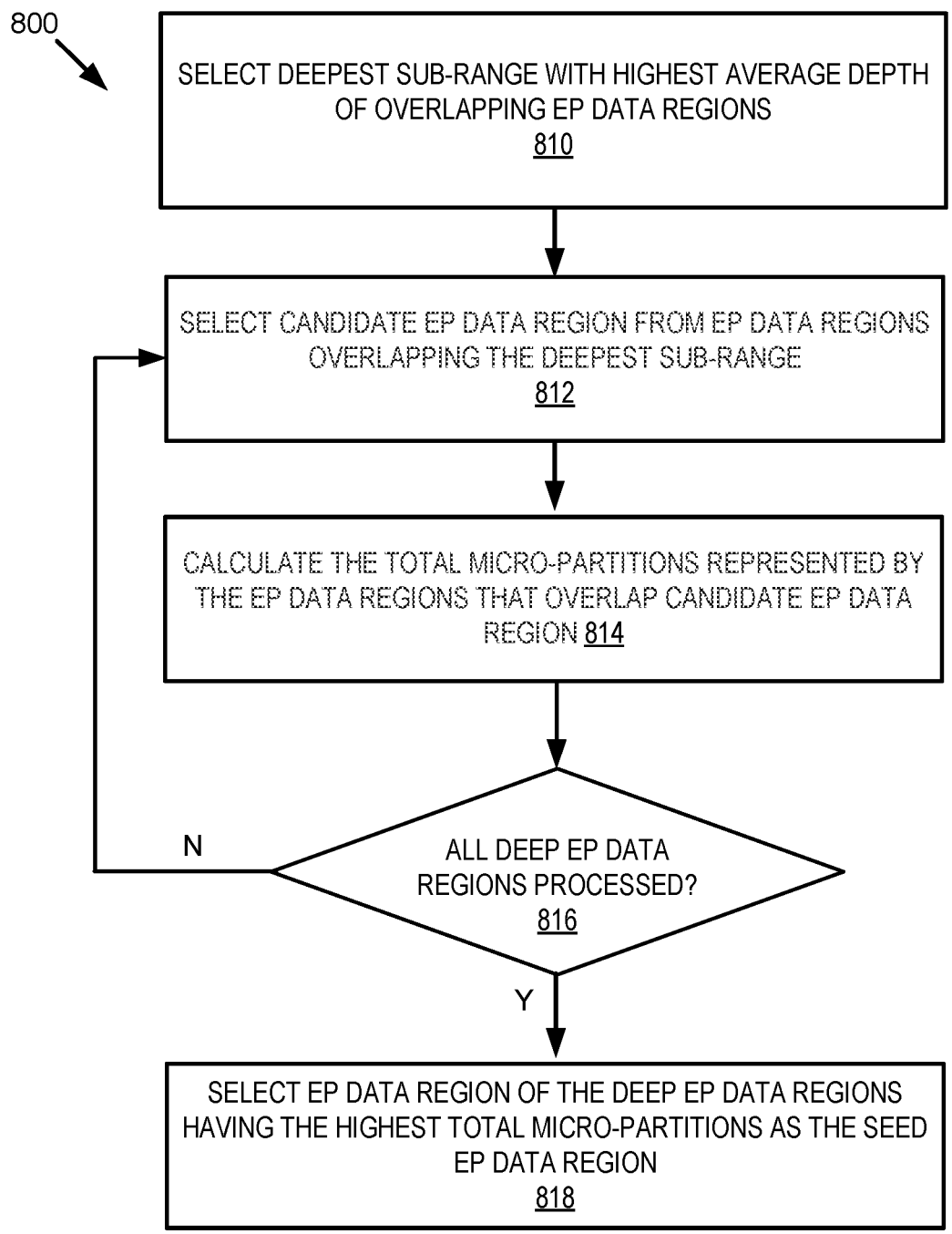
FIG. 8A is a flow diagram of one embodiment of a method for selecting a seed EP data region, according to some embodiments of the present disclosure.
Figure 8B:
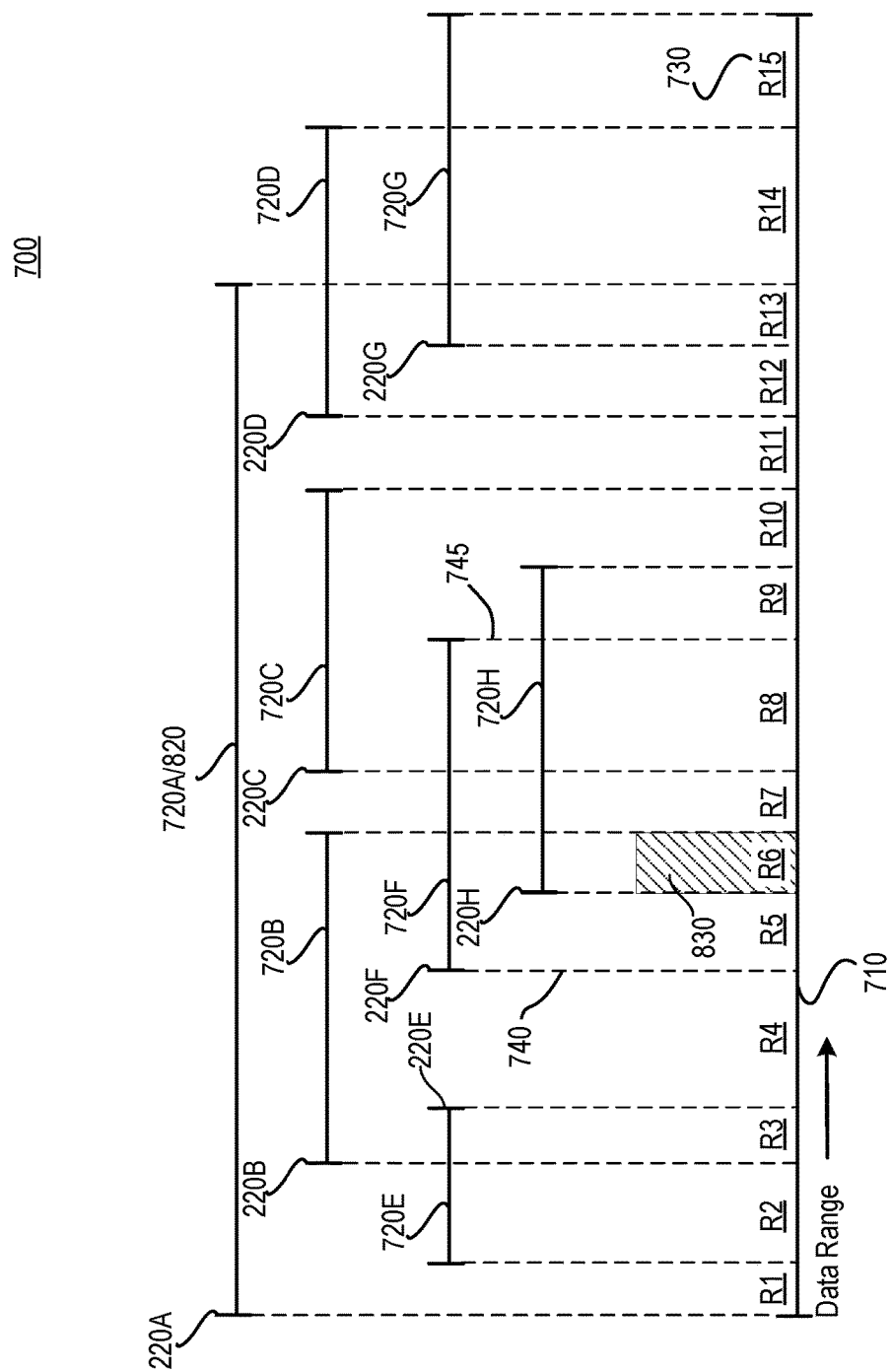
FIG. 8B is a block diagram of the data structure illustrating an example scenario of selecting the seed EP data region, according to some embodiments of the present disclosure.

Referring back to FIG. 6, in operation 620, a seed EP data region 820 is selected based on the sub-ranges 730 determined in operation 610. FIG. 8A is a flow diagram of one embodiment of a method 800 for selecting a seed EP data region 820, according to some embodiments of the present disclosure. In general, the method 800 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. FIG. 8B is a block diagram of the data structure 700 illustrating an example scenario of selecting the seed EP data region 820, according to some embodiments of the present disclosure.

With reference to FIG. 8A, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

With reference to FIGS. 8A and 8B, the method 800 may begin at operation 810 in which a deepest sub-range 830 of the sub-ranges 730 is selected. The deepest sub-range 830 may be selected based on a total average depth of the sub-range 730. The total average depth for a given sub-range 730 may be a sum of the average depths of the EP data regions 720 that overlap the sub-range 730. For example, referring to FIG. 8B, the sixth sub-range R6 may be selected as the deepest sub-range 830. This selection may be based on the arrangement where the sixth sub-range R6 is overlapped by the first EP data region 720A which has an average depth of 3, the second EP data region 720B which has an average depth of 7, the sixth EP data region 720F which has an average depth of 3, and the eighth EP data region 720H which has an average depth of 2, for a total average depth for the overlapping EP data regions of 15. This total average depth is higher than the total average depth for any of the other sub-ranges 730. As a result, the sixth sub-range R6 will be selected as the deepest sub-range 830.

Referring to FIG. 8A, in operation 812, a candidate EP data region 720 may be selected from the EP data regions 720 that overlap the deepest sub-range 830. The EP data regions 720 that overlap the deepest sub-range 830 may also be referred to herein as deep EP data regions. Referring to the example of FIG. 8B, four EP data regions 720 overlap the deepest sub-range 830: the first EP data region 720A, the second EP data region 720B, the sixth EP data region 720F, and the eighth EP data region 720H. As an example, the first EP data region 720A may be selected as the candidate EP data region 720.

Referring to FIG. 8A, in operation 814, the deep EP data regions 720 that overlap the candidate EP data region 720 and the deepest sub-range 830 may be determined, and a total number of micro-partitions 210 represented by those overlapping EP data regions 720 may be calculated. For example, referring to the example of FIG. 8B, if the first EP data region 720A is selected as the candidate EP data region 720, it is overlapped by seven other EP data regions 720

(720B, 720A, 720C, 720D, 720E, 720F, 720G, and 720H), for a total number of represented micro-partitions 210 of 1600 (per Table 1, above).

In operation 816, it may be determined if all of the EP data regions 720 that overlap the deepest sub-range 830 determined in operation 810 have been processed. If not, operation 812 and 814 may be repeated for each of the EP data regions 720 that overlap the deepest sub-range 830. In the example illustrated in FIG. 8B, these operations would further result in analysis of the second EP data region 720B (overlapped by 720A, 720E, 720F, and 720H, for 500 total micro-partitions 210), the sixth EP data region 720F (overlapped by 720A, 720B, 720C, and 720H, for 750 total micro-partitions 210), and the eighth EP data region 720H (overlapped by 720A, 720B, 720C, and 720F, for 750 total micro-partitions 210).

After the total number of micro-partitions 210 of all of the EP data regions 720 that overlap the deepest sub-range 830 have been processed, the seed EP data region 820 may be selected as the EP data region 720 that overlaps the deepest sub-range 830 (e.g., a deep EP data region) and also overlaps the highest number of micro-partitions 210 of the EP data regions 720. In the example illustrated in FIG. 8B, the seed EP data region 820 is selected as the first EP data region 720A based on its overlap of the deepest sub-range R6 and the number of micro-partitions 210 represented by the EP data regions 720 (e.g., 1600) that overlap the first EP data region 720A.

Figure 9A:
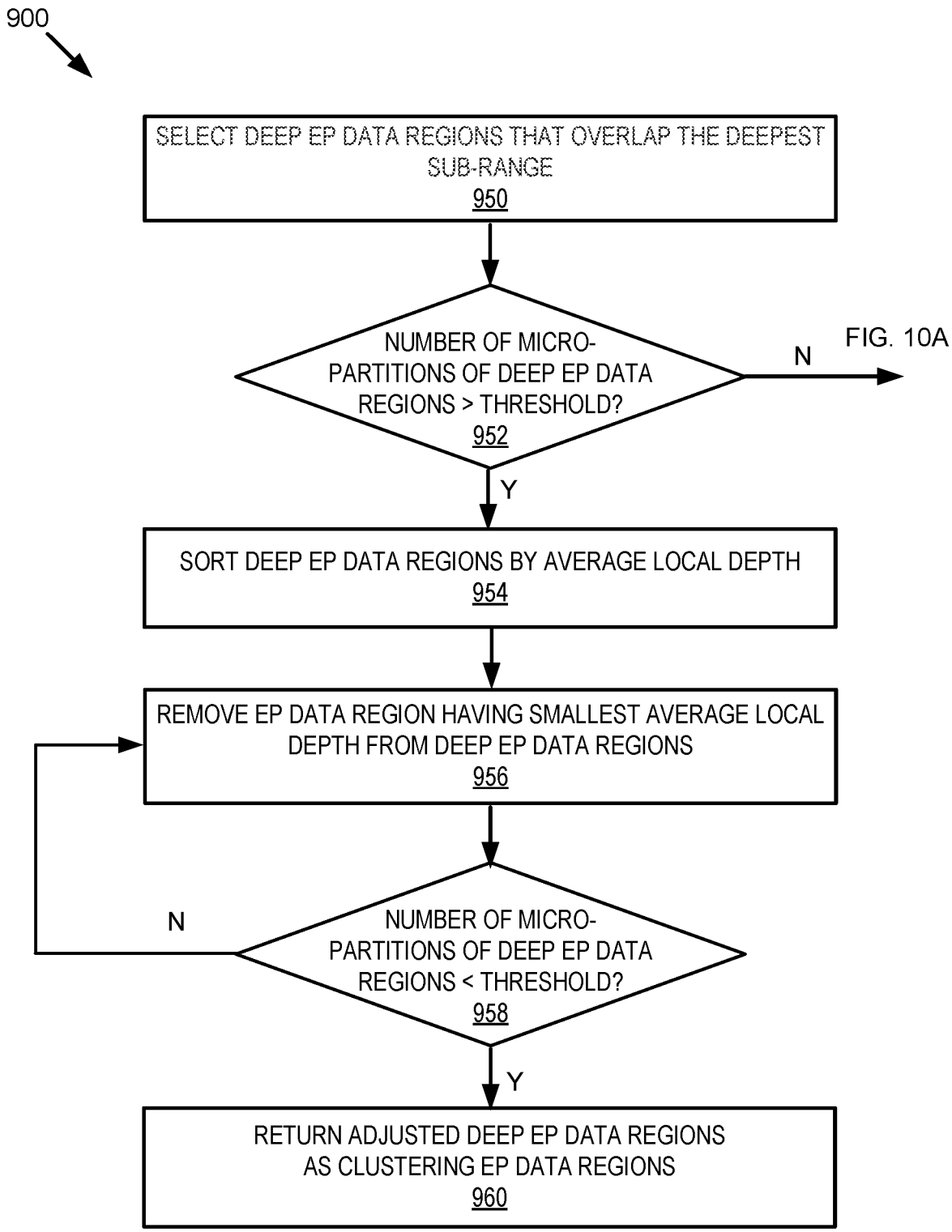
FIG. 9A is a flow diagram of one embodiment of a method for selecting clustering EP data regions, according to some embodiments of the present disclosure.
Figure 9B:
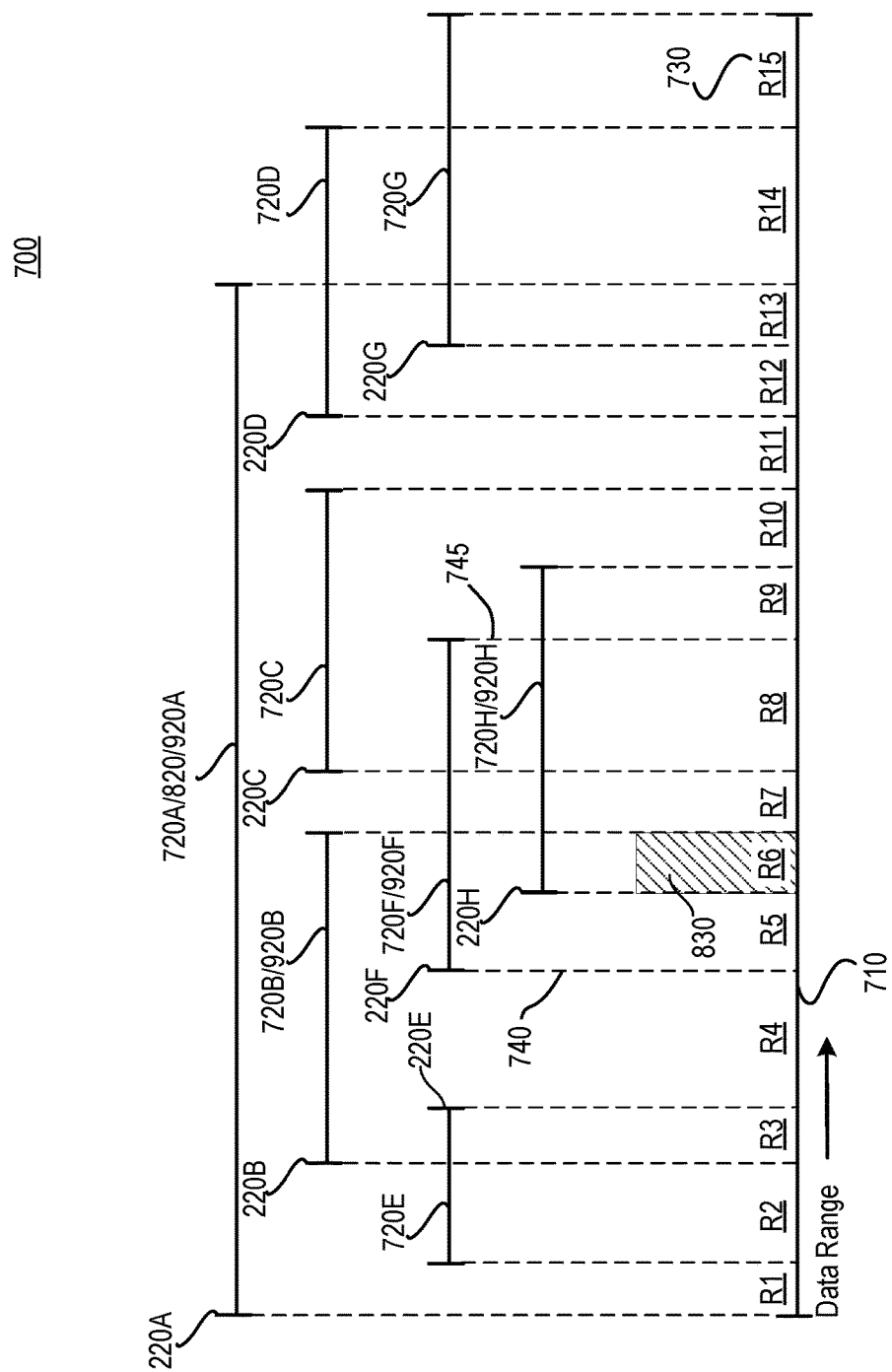
FIG. 9B is a block diagram of the data structure illustrating an example scenario of selecting clustering EP data regions, according to some embodiments of the present disclosure.

Referring back to FIG. 6, in operation 630, a plurality of clustering EP data regions may be selected based on the seed EP data region 820 determined in operation 620. FIG. 9A is a flow diagram of one embodiment of a method 900 for selecting clustering EP data regions 920, according to some embodiments of the present disclosure. In general, the method 900 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. FIG. 9B is a block diagram of the data structure 700 illustrating an example scenario of selecting the clustering EP data regions 920, according to some embodiments of the present disclosure.

With reference to FIG. 9A, method 900 illustrates example functions used by various embodiments. Although specific function blocks ("blocks") are disclosed in method 900, such blocks are examples. That is, embodiments are well suited to performing various other blocks or variations of the blocks recited in method 900. It is appreciated that the blocks in method 900 may be performed in an order different than presented, and that not all of the blocks in method 900 may be performed.

With reference to FIGS. 9A and 9B, the method 900 may begin at operation 950 in which deep EP data regions 920 are selected as EP data regions 720 that overlap the deepest sub-range 830. These deep EP data regions 920 may be the same as the overlapping EP data regions 720 described with respect to operation 812 of FIG. 8A. In the example illustrated in FIG. 9B, the deep EP data regions 920 may be identified as the first EP data region 720A, 920A, which is also the seed EP data region 820, the second EP data region 720B, 920B, the sixth EP data region 720F, 920F, and the eighth EP data region 720H, 920H.

Referring back to FIG. 9A, the number of micro-partitions 210 represented by the deep EP data regions 920 may be counted. For example, in the configuration of FIG. 9B, the number of micro-partitions 210 represented by the deep EP data regions 920 is 700 (per Table 1). At operation 952, it may be determined if the number of micro-partitions 210 represented by the deep EP data regions 920 is greater than a defined threshold (e.g., one thousand micro-partitions 210).

If the number of micro-partitions 210 represented by the deep EP data regions 920 is not greater than the threshold (operation 952:N), the method 600 continues to expand the number of EP data regions 720 that are used for the clustering operation. Those operations will be described with respect to FIGS. 10A and 10B herein.

If the number of micro-partitions 210 represented by the deep EP data regions 920 is greater than the threshold (operation 952:Y), enough micro-partitions 210 may be available for clustering. In such an event, the method 900 may continue to operation 954 in which the deep EP data regions 920 may be sorted by their average local depth. In the example of FIG. 9B, the deep EP data regions 920 include the first deep EP data region 920A with an average depth of 3, the second deep EP data region 920B with an average depth of 7, the sixth deep EP data region 920F with an average depth of 3, and the eighth deep EP data region 920H with an average depth of 2. Sorting these deep EP data regions 920 may result in an ordering of 920H, 920A/920B, 920F.

At operation 956, the deep EP data region 920 having the smallest average local depth (the eighth deep EP data region 920H in the example of FIG. 9B) may be removed from the deep EP data regions 920, and the number of micro-partitions 210 remaining in the deep EP data regions 920 may be examined to determine if the number of micro-partitions 210 represented by the remaining deep EP data regions 920 is less than the threshold. If not (operation 958:N) the method 900 may revert to operation 956 where another of the deep EP data regions 920 is removed. The process may continue until the number of micro-partitions 210 represented by the remaining deep EP data regions 920 is less than the threshold (operation 958:N).

For example, referring to the example of FIG. 9B, if it were to be assumed that the threshold was 650, the number of micro-partitions 210 represented by the deep EP data regions 920 calculated for operation 952 is 700. Following the operations of operation 954, the eighth deep EP data region 920H would have the smallest average local depth, and would be removed from the deep EP data regions 920 in operation 956. This would leave the first deep EP data region 920A, the second deep EP data region 920B, and the sixth deep EP data region 920F with a total number of 600 represented micro-partitions 210, which would be less than the threshold at operation 958.

In operation 960, once the deep EP data regions 920 are adjusted to be below the threshold, the deep EP data regions 920 may be returned as the clustering EP data regions 720 for clustering (e.g., as a result of operation 630 of FIG. 6).

Figure 10A:
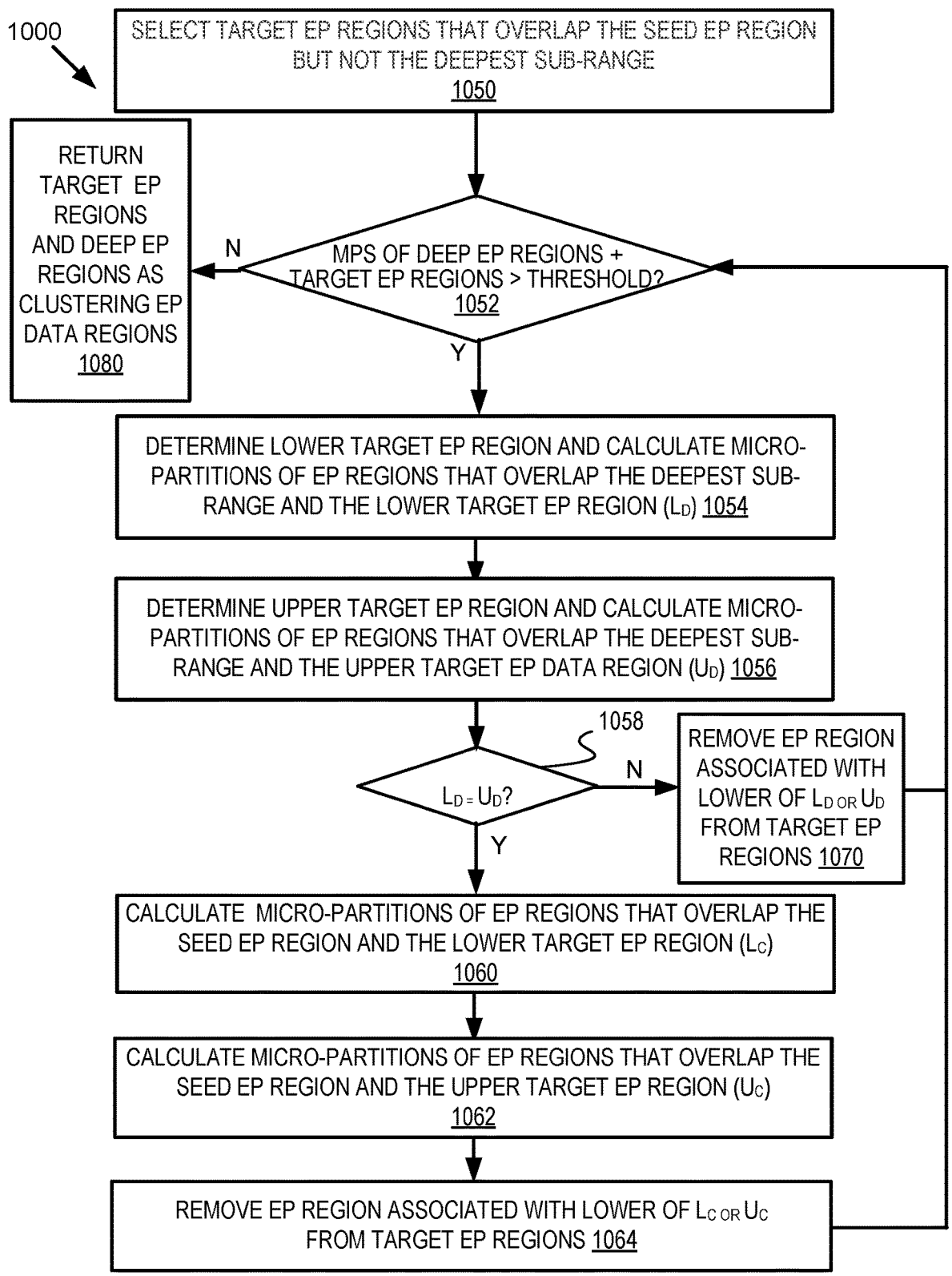
FIG. 10A is a flow diagram of one embodiment of a method for selecting clustering EP data regions, according to some embodiments of the present disclosure.
Figure 10B:
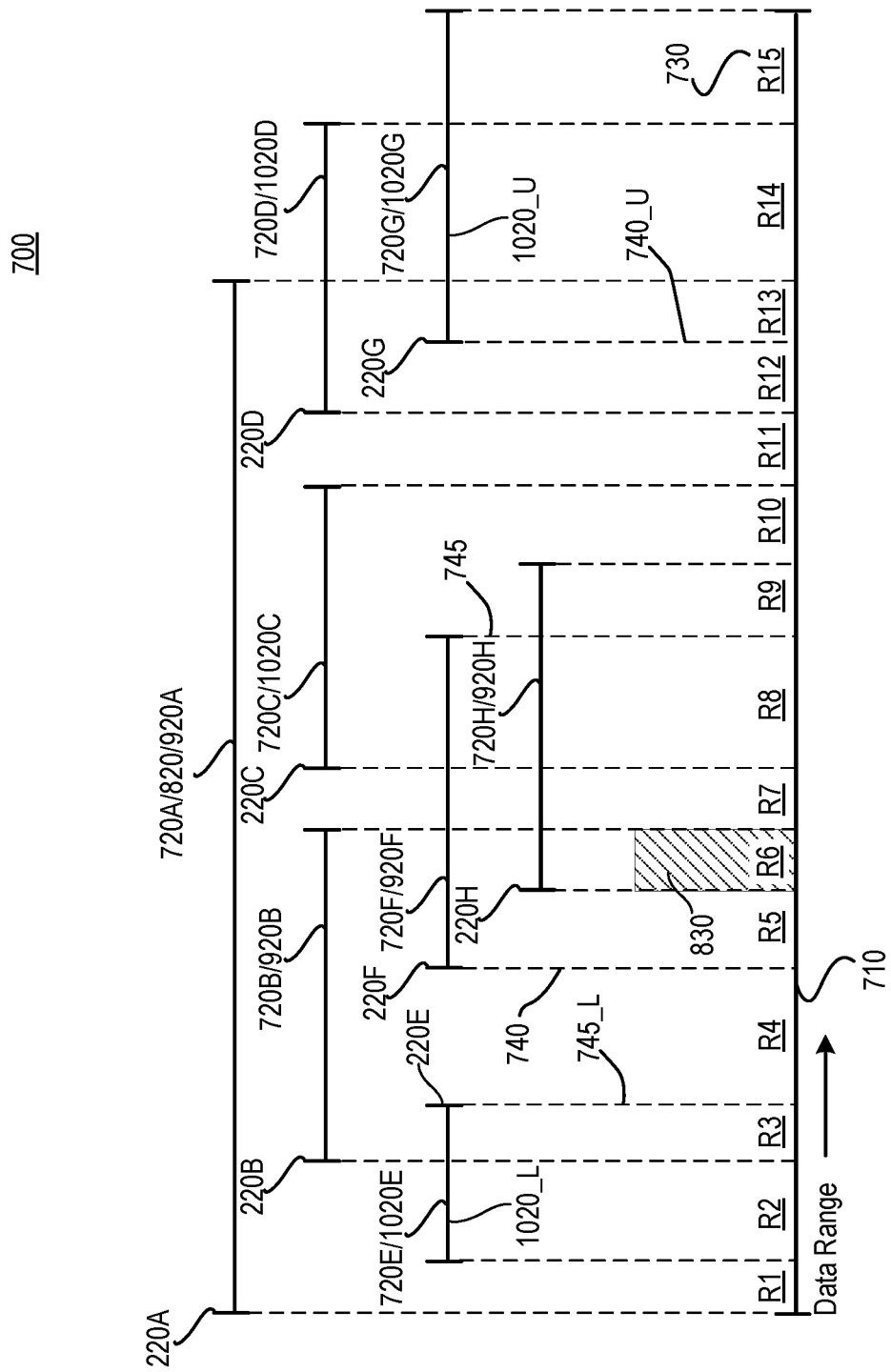
FIG. 10B is a diagram of the data structure illustrating an example scenario of selecting the clustering EP data regions, according to some embodiments of the present disclosure.

As previously noted, if the number of micro-partitions 210 of the deep EP data regions 920 determined in operation 952 are not greater than the threshold, additional EP data regions 920 may be identified for inclusion. FIG. 10A is a flow diagram of one embodiment of a method 1000 for selecting clustering EP data regions 1020, according to some embodiments of the present disclosure. In general, the method 1000 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. FIG. 10B is a diagram of the data structure 700 illustrating an example scenario of selecting the clustering EP data regions 1020, according to some embodiments of the present disclosure.

With reference to FIG. 10A, method 1000 illustrates example functions used by various embodiments. Although specific function blocks ("blocks") are disclosed in method 1000, such blocks are examples. That is, embodiments are well suited to performing various other blocks or variations of the blocks recited in method 1000. It is appreciated that the blocks in method 1000 may be performed in an order different than presented, and that not all of the blocks in method 1000 may be performed.

With reference to FIGS. 10A and 10B, method 1000 may begin operation (after the operations described herein with respect to FIG. 9A) at operation 1050 in which a plurality of target EP data regions 1020 are selected. The target EP data regions 1020 may be selected as those EP data regions 720 that overlap the seed EP data region 820 (described herein with respect to FIGS. 8A and 8B) but not the deepest sub-range 830. In the example of FIG. 10B, the target EP data regions 1020 include the third EP data region 720C, 1020C, the fourth EP data region 720D, 1020D, the fifth EP data region 720E, 1020E, and the seventh EP data region 720G, 1020G.

In operation 1052, the number of micro-partitions 210 represented by the deep EP data regions 920 (see FIGS. 9A and 9B) and the target EP data regions 1020 may be compared to the threshold value. In the example of FIG. 10B, the number of micro-partitions 210 represented by the deep EP data regions 920 (see FIGS. 9A and 9B) and the target EP data regions 1020 is 1600 (per Table 1). If the number of micro-partitions 210 represented by the deep EP data regions 920 (see FIGS. 9A and 9B) and the target EP data regions 1020 is not greater than the threshold (operation 1052:N), the method 1000 may continue to operation 1080 in which the deep EP data regions 920 and the target EP data regions 1020 may be returned as the clustering EP data regions 720 for clustering (e.g., as a result of operation 630 of FIG. 6).

If the number of micro-partitions 210 represented by the deep EP data regions 920 (see FIGS. 9A and 9B) and the target EP data regions 1020 is greater than the threshold (operation 1052:Y), the method 1000 may continue to operation 1054 to adjust the members of the target EP data regions 1020. In operation 1054, a lower target EP data region 1020_L may be determined. The lower target EP data region 1020_L may be determined by identifying a lowest maximum data value 745_L (e.g., of the data range 710 of the clustering key) of the maximum data values 745 of the target EP data regions 1020 that overlap with the seed EP data region 820. The lower target EP data region 1020_L may be determined as the target EP data region 1020 that does not overlap with the lowest maximum data value 745_L. In the example of FIG. 10B, the lower target EP data region 1020_L is the fifth EP data region 720E. Once the lower target EP data region 1020_L is determined, the number of micro-partitions 210 represented by the members of the deep EP data regions 920 (see FIGS. 9A and 9B) that overlap the lower target EP data region 1020_L may be calculated. In the example of FIG. 10B, the first deep EP data region 920A and the second deep EP data region 920B overlap the fifth EP data region 720E, so the number of micro-partitions 210 represented by the members of the deep EP data regions 920 that overlap the fifth EP data region 720E is 500 (per Table 1). This number will be designated as $L_D$.

In operation 1056, an upper target EP data region 1020_U may be determined. The upper target EP data region 1020_U may be determined by identifying a highest minimum data value 740_U (e.g., of the data range 710 of the clustering key) of the minimum data values 740 of the target EP data regions 1020 that overlap with the seed EP data region 820. The upper target EP data region 1020_U may be determined as the target EP data region 1020 that does not overlap with the highest minimum data value 740_U. In the example of FIG. 10B, the upper target EP data region 1020_U is the seventh EP data region 720G. Once the upper target EP data region 1020_U is determined, the number of micro-partitions 210 represented by the members of the deep EP data regions 920 that overlap the upper target EP data region 1020_U may be calculated. In the example of FIG. 10B, only the first deep EP data region 920A overlaps the seventh EP data region 720G, so the number of micro-partitions 210 represented by the members of the deep EP data regions 920 that overlap the seventh EP data region 720G is 100 (per Table 1). This number will be designated as $U_D$.

In operation 1058, $U_D$ is compared to $L_D$. If $U_D$ is not equal to $L_D$ (operation 1058:N), the EP data region 720 that is associated with the lower of $U_D$ or $L_D$ is removed from the target EP data regions 1020 in operation 1070. In the example of FIG. 10B, the seventh EP data region 720G would be removed from the target EP data regions 1020. After the target EP data regions 1020 are adjusted in operation 1070, the method 1000 may revert back to operation 1052 to compare the number of micro-partitions 210 represented by the deep EP data regions 920 and the target EP data regions 1020 to the threshold value.

If $U_D$ is equal to $L_D$ (operation 1058:Y), the method 1000 may continue to operation 1060. In operation 1060, the number of micro-partitions 210 represented by the EP data regions 720 that overlap the lower target EP data region 1020_L and the seed EP data region 820 may be calculated. In the example of FIG. 10B, the second EP data region 720B overlaps the lower target EP data region 1020_L (the fifth EP data region 720E), so the number of micro-partitions 210 represented by the members of the EP data regions 720 that overlap the lower target EP data region 1020_L and the seed EP data region 820 is 400 (per Table 1). This number will be designated as $L_C$.

In operation 1062, the number of micro-partitions 210 represented by the EP data regions 720 that overlap the upper target EP data region 1020_U and the seed EP data region 820 may be calculated. In the example of FIG. 10B, the fourth EP data region 720D overlaps the upper target EP data region 1020_U (the seventh EP data region 720G), so the number of micro-partitions 210 represented by the members of the EP data regions 720 that overlap the upper target EP data region 1020_U and the seed EP data region 820 is 50 (per Table 1). This number will be designated as $U_C$.

In operation 1064, the EP data region 720 that is associated with the lower of $L_C$ or $U_C$ is removed from the target EP data regions 1020 in operation 1064. In the example of FIG. 10B, had $L_D$ been equal to $U_D$, the seventh EP data region 720G would have been removed from the target EP data regions 1020. After the target EP data regions 1020 are adjusted in operation 1064, the method 1000 may revert back to operation 1052 to compare the number of micro-partitions 210 represented by the deep EP data regions 920 and the target EP data regions 1020 to the threshold value. The operations of the method 1000 may continue until the number of micro-partitions 210 represented by the deep EP data regions 920 and the target EP data regions is less than the threshold value and operation 1080 is executed, in which the remaining target EP data regions 1020 and the deep EP data regions 920 are returned as the clustering EP data regions 720 for clustering in the method 600 of FIG. 6.

Referring back to FIG. 6, as a result of the methods 900, 1000 described with respect to FIGS. 7 to 10B, a plurality of clustering EP data regions 720 may be identified. In some embodiments, the method 600 may continue with operation 640, in which additional EP data regions 720 may be added to the clustering EP data regions 720. In some embodiments, additional EP data regions 720 may be identified by performing the operations of FIGS. 7 to 10B again utilizing a higher threshold and/or a different range. For example, the embodiments of FIGS. 7 to 10B may operate on the range of the seed EP data region 820 identified in method 800 of FIG. 8A. In some embodiments, the range may be increased beyond that of the seed EP data region 820, and the operations of FIGS. 7 to 10B may be repeated.

In some embodiments, rather than adjusting the range and/or threshold, additional clustering EP data regions 720 by repeating the operations of FIGS. 7 to 10B after removing the EP data regions 720 identified in operation 630 from the group of EP data regions 720 being considered. The clustering EP data region selection algorithm may work on the adjusted batch of EP data regions 720 without touching the EP data regions 720 selected in the previous iteration.

This solution may have two advantages. First, each iteration may pick the EP data regions 720 overlapping with the deepest data sub-range 830. As a result, this solution can reduce the depth of multiple ranges in one micro-partition clustering. Second, this solution is more efficient because one EP data region 720 is only processed once in the EP data regions 720 selection phase. In each iteration, the EP data regions 720 selection phase processes a limited number of EP data regions 720 such that it will not utilize large amounts of memory.

In operation 650, a clustering operation may be performed on the micro-partitions 210 that are represented by the clustering EP data regions 720 selected in operations 630 and/or 640. The clustering operation may examine the data ranges of the micro-partitions 210 represented by the clustering EP data regions 720 that were selected to determine if the ranges of some of the micro-partitions 210 may be reduced and/or micro-partitions can be combined. For example, data of the micro-partitions may be moved and/or recombined between micro-partitions 210 so there is less overlap between micro-partitions 210 and/or EP data regions 720. In some embodiments, the clustering may be performed based on the data ranges of the clustering key. In some embodiments, the micro-partitions 210 are stored in immutable storage, so moving and/or recombining the data between micro-partitions 210 may include generating new micro-partitions 210 that contain different combinations of the data.

Clustering the micro-partitions 210 so that they have less overlap may allow for more efficient data query pruning, as described herein. Moreover, by utilizing the mechanisms described herein to select the micro-partitions 210, only a subset of all of the EP data regions 720 may be analyzed during the clustering operation. By reducing the number of EP data regions 720 that are analyzed for the clustering operation, less memory may be used and the clustering operation may be performed more quickly. In addition, embodiments of the present disclosure attempt to select the micro-partitions 210 that will have the highest impact on clustering by focusing the selection of the EP data regions 720 for clustering based on the deepest data sub-range 830. The deepest data sub-range 830 may include the micro-partitions 210 having a large amount of overlap.

The operations of the method 600 may be repeated during the operation of the database. For example, once a clustering operation has been performed, the ranges of the EP files 220 and their associated micro-partitions 210 will have changed. As a result, a repeat of the operations of the method 600 may select different EP files 220 with different respective EP data regions 720 for clustering on a subsequent iteration. Because the method 600 selects only a subset of the EP files 220 for clustering in each iteration, it may utilize less memory and/or processing time while continually improving the organization of the data in the database.

Figure 11:
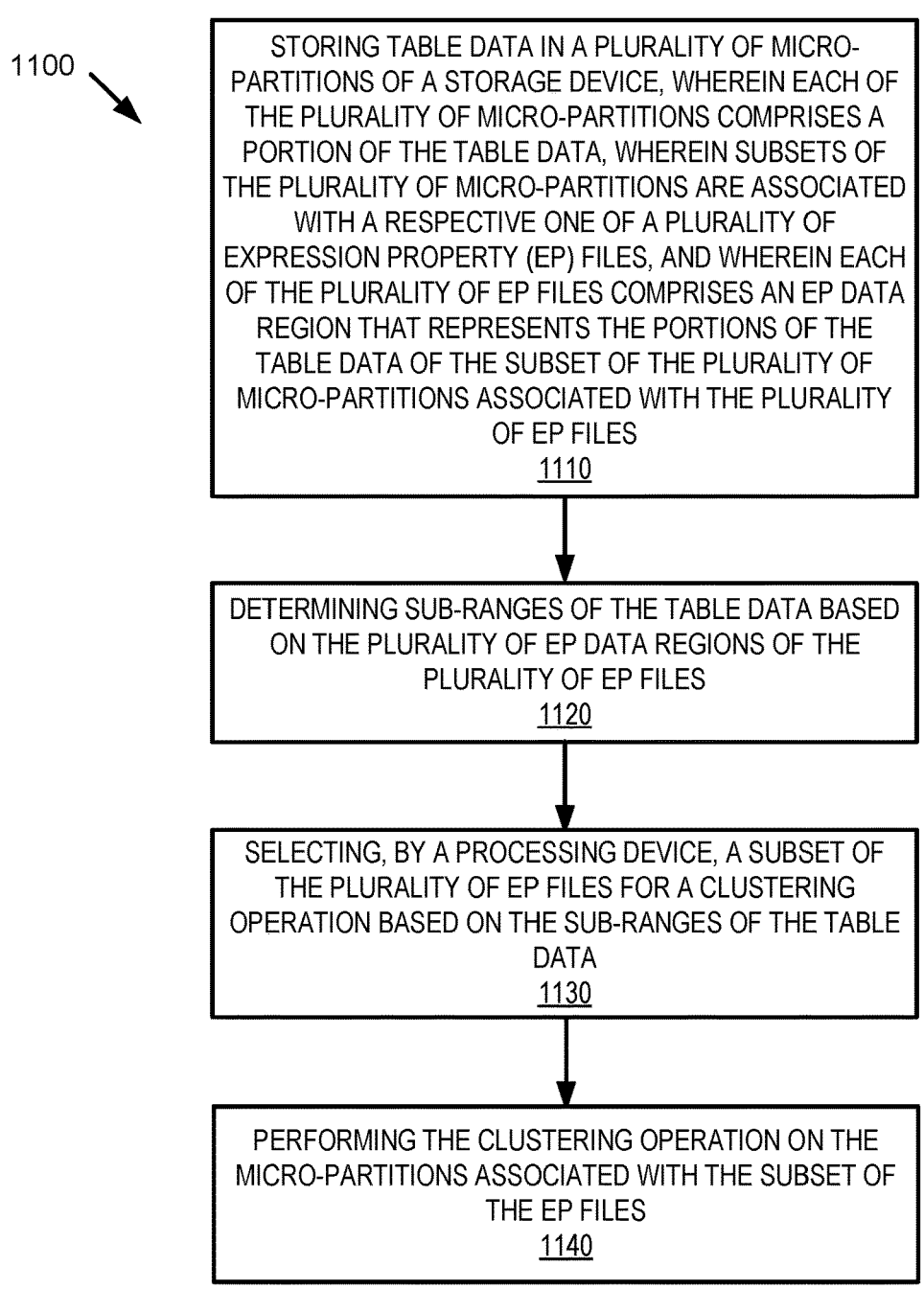
FIG. 11 is a flow diagram of one embodiment of a method for selecting micro-partitions for a clustering operation, according to some embodiments of the present disclosure.

FIG. 11 is a flow diagram of one embodiment of a method 1100 for selecting micro-partitions 210 for a clustering operation, according to some embodiments of the present disclosure. In general, the method 1100 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof.

With reference to FIG. 11, method 1100 illustrates example functions used by various embodiments. Although specific function blocks ("blocks") are disclosed in method 1100, such blocks are examples. That is, embodiments are well suited to performing various other blocks or variations of the blocks recited in method 1100. It is appreciated that the blocks in method 1100 may be performed in an order different than presented, and that not all of the blocks in method 1100 may be performed.

Method 1100 begins at operation 1110, which includes storing table data in a plurality of micro-partitions of a storage device. Each of the plurality of micro-partitions may include a portion of the table data. Subsets of the plurality of micro-partitions may be associated with a respective one of a plurality of EP files. Each of the plurality of EP files may include an EP data region that represents the portions of the table data of the subset of the plurality of micro-partitions associated with the EP file. The micro-partitions may be similar to the micro-partitions 210 described herein with respect to FIGS. 1 to 10B. The EP files may be similar to the EP files 220 described herein with respect to FIGS. 2 to 10B. The EP data regions may be similar to the EP data regions 720 described herein with respect to FIGS. 7 to 10B. The EP data regions may be similar to the EP data regions 720 described herein with respect to FIGS. 7 to 10B.

In operation 1120, the method 1100 may include determining sub-ranges of the table data based on the plurality of EP data regions of the plurality of EP files. The sub-ranges may be similar to the sub-ranges 730 described herein with respect to FIGS. 7 to 10B.

In operation 1130, the method 1100 may include selecting (e.g., by a processing device) a subset of the plurality of EP files for a clustering operation based on the sub-ranges of the table data. The subset of the plurality of EP files may be similar to the EP files 220 associated with the clustering EP data regions 720 selected for clustering described herein with respect to FIGS. 6 to 10B.

In some embodiments, selecting the subset of the plurality of EP files for the clustering operation based on the sub-ranges of the table data includes selecting EP files of the plurality of EP files that comprise table data having values that overlap a sub-range that is associated with highest average micro-partition depth, as described herein with respect to FIGS. 1 to 10B.

In some embodiments, selecting the subset of the plurality of EP files for the clustering operation based on the sub-ranges of the table data may include, for each sub-range of the sub-ranges, calculating a total average micro-partition depth of ones of the plurality of EP data regions comprising table data that overlaps the sub-range, selecting the sub-range having a highest total average micro-partition depth as a deepest sub-range of the sub-ranges, and selecting the subset of the plurality of EP files for the clustering operation based on the deepest sub-range. The deepest sub-range may be similar to the deepest sub-range 830 described herein with respect to FIGS. 8 to 10B.

In some embodiments, selecting the subset of the plurality of EP files for the clustering operation based on the deepest sub-range includes determining a group of overlapping EP data regions that comprise table data that overlap the deepest sub-range, selectively removing at least one of the overlapping EP data regions from the group of the overlapping EP data regions until a sum of the micro-partitions associated with the group of the overlapping EP data regions is less than a threshold value, and returning the EP files associated with the group of overlapping EP data regions as the subset of the EP files. The selective removal of the overlapping EP data regions is described herein, for example, with respect to FIGS. 9A and 9B.

In some embodiments, selecting the subset of the plurality of EP files for the clustering operation based on the deepest sub-range includes determining deep EP data regions of the plurality of EP data regions that overlap the deepest sub-range, selecting a seed EP data region from the deep EP data regions, and selecting the EP files associated with the EP data regions of the plurality of EP data regions that overlap the seed EP data region as the subset of the plurality of EP files for the clustering operation. The determination of the deep EP data regions and the selection of the seed EP data region is described herein, for example, with respect to FIGS. 8A to 10B.

In some embodiments, selecting the seed EP data region includes, for each deep EP data region of the deep EP data regions, determining a set of the plurality of EP data regions comprising table data that overlaps with table data of the deep EP data region, calculating a sum of micro-partitions associated with each of the sets of the EP data regions, and selecting the seed EP data region as the deep EP data region associated with the set of EP data regions having a highest sum of micro-partitions. The determination of the seed EP data region is described herein, for example, with respect to FIGS. 8A and 8B.

In some embodiments, selecting the EP files associated with the EP data regions of the plurality of EP data regions that overlap the seed EP data region as the subset of the plurality of EP files for the clustering operation includes determining a group of target EP data regions that comprise table data that overlaps the table data of the seed EP data region but not the deepest sub-range, selectively removing at least one of the target EP data regions from the group of the target EP data regions based on a number of micro-partitions associated with the at least one target EP data region to generate adjusted target EP data regions, and selecting the EP files associated with the adjusted target EP data regions and the deep EP data regions as the subset of the plurality of EP files for the clustering operation. The selective removal of the target EP data regions is described herein, for example, with respect to FIGS. 10A and 10B.

In operation 1140, the method 1100 may include performing the clustering operation on the micro-partitions associated with the subset of the plurality of EP files. The clustering operation may be similar to the clustering operation described herein, such as with respect to FIGS. 2 to 5.

Figure 12:
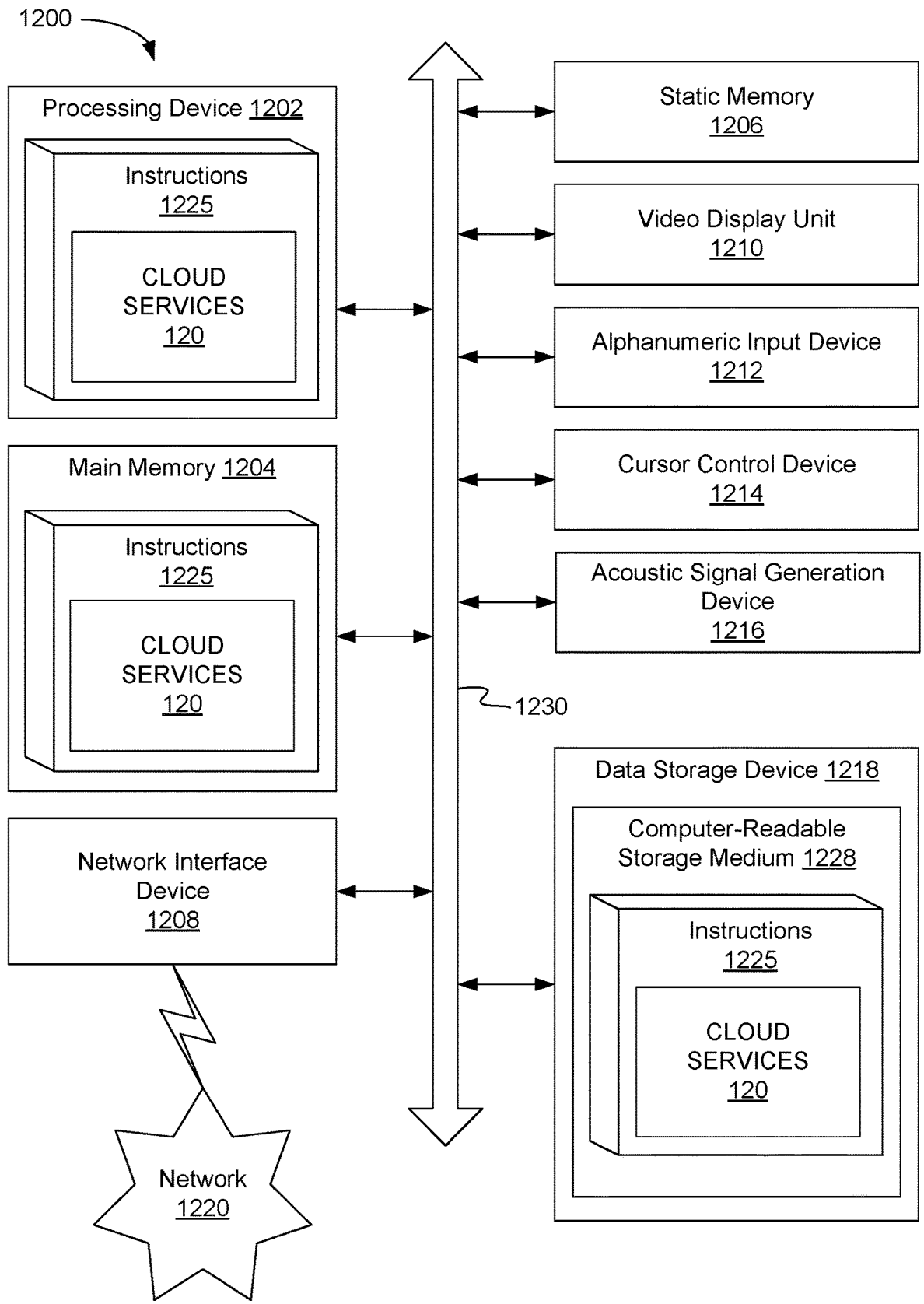
FIG. 12 is a block diagram of an example computing device that may perform one or more of the operations described herein, in accordance with some embodiments of the present disclosure.

FIG. 12 is a block diagram of an example computing device 1200 that may perform one or more of the operations described herein, in accordance with some embodiments. Computing device 1200 may be connected to other computing devices in a LAN, an intranet, an extranet, and/or the internet. The computing device may operate in the capacity of a server machine in a client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1200 may include a processing device (e.g., a general purpose processor, a PLD, etc.) 1202, a main memory 1204 (e.g., synchronous dynamic random access memory (DRAM), read-only memory (ROM)), a static memory 1206 (e.g., flash memory) and a data storage device 1218, which may communicate with each other via a bus 1230.

Processing device 1202 may be provided by one or more general-purpose processing devices such as a microprocessor, central processing unit, or the like. In an illustrative example, processing device 1202 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1202 may also comprise one or more special-purpose processing devices such as an application specific integrated circuit (ASIC), a field programmable gate array (FPGA), a digital signal processor (DSP), network processor, or the like. The processing device 1202 may be configured to execute the operations described herein, in accordance with one or more aspects of the present disclosure, for performing the operations and steps discussed herein. In one embodiment, processing device 1202 represents a processing device of cloud computing platform 110 of FIG. 1.

Computing device 1200 may further include a network interface device 1208 which may communicate with a network 1220. The computing device 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse) and an acoustic signal generation device 1216 (e.g., a speaker). In one embodiment, video display unit 1210, alphanumeric input device 1212, and cursor control device 1214 may be combined into a single component or device (e.g., an LCD touch screen).

Data storage device 1218 may include a computer-readable (also referred to herein as machine-readable) storage medium 1228 on which may be stored one or more sets of instructions 1225, such as instructions for executing the cloud services component 120, e.g., instructions for carrying out the operations described herein, in accordance with one or more aspects of the present disclosure. Cloud services instructions 120 may also reside, completely or at least partially, within main memory 1204 and/or within processing device 1202 during execution thereof by computing device 1200, the main memory 1204 and processing device 1202 also constituting computer-readable media. The instructions 1225 may further be transmitted or received over a network 1220 via network interface device 1208.

While computer-readable storage medium 1228 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

Unless specifically stated otherwise, terms such as "storing," "determining," "selecting," "performing," "calculating," "removing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud). The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   storing table data in a plurality of micro-partitions of a storage device, wherein each of the plurality of micro-partitions comprises a portion of the table data, wherein subsets of the plurality of micro-partitions are associated with a respective one of a plurality of expression property (EP) files, and wherein each of the plurality of EP files comprises an EP data region that represents the portions of the table data of the subset of the plurality of micro-partitions associated with the EP file;
   determining sub-ranges of the table data based on the plurality of EP data regions of the plurality of EP files, wherein each sub-range corresponds to an interval between adjacent minimum values or adjacent maximum values among the plurality of EP data regions;
   for each sub-range of the sub-ranges, calculating a total average micro-partition depth of ones of the plurality of EP data regions comprising table data that overlaps the sub-range;
   determining from the plurality of EP data regions, a set of EP data regions that each comprise table data that overlap a deepest sub-range of the sub-ranges, the deepest sub-range having a highest total average micro-partition depth;
   selecting a subset of the plurality of EP files for a clustering operation based at least in part on a number of micro-partitions represented by the set of EP data regions; and
   performing the clustering operation on the micro-partitions associated with the subset of the plurality of EP files to reduce an amount of memory required for the clustering operation.

2. The method of claim 1, wherein selecting the subset of the plurality of EP files for the clustering operation comprises:
   selectively removing at least one of the set of EP data regions until a sum of the micro-partitions associated with the set of EP data regions is less than a threshold value; and
   selecting the EP files associated with the set of EP data regions as the subset of the plurality of EP files for the clustering operation.

3. The method of claim 1, wherein selecting the subset of the plurality of EP files for the clustering operation comprises:
   selecting a seed EP data region from the set of EP data regions; and
   selecting as the subset of the plurality of EP files for the clustering operation, the EP files associated with the EP data regions of the plurality of EP data regions that overlap the seed EP data region.

4. The method of claim 3, wherein selecting the seed EP data region comprises:
   for each EP data region of the set of EP data regions, determining a subset of the plurality of EP data regions comprising table data that overlaps with table data of the EP data region of the set of EP data regions;
   calculating a sum of micro-partitions associated with each of the subsets of the EP data regions; and
   selecting the seed EP data region as the EP data region of the set of EP data regions associated with the subset of EP data regions having a highest sum of micro-partitions.

5. The method of claim 3, wherein selecting the EP files associated with the EP data regions of the plurality of EP data regions that overlap the seed EP data region as the subset of the plurality of EP files for the clustering operation comprises:
   determining a group of target EP data regions that comprise table data that overlaps the table data of the seed EP data region but not the deepest sub-range;
   selectively removing at least one of the target EP data regions from the group of the target EP data regions based on a number of micro-partitions associated with the at least one target EP data region to generate adjusted target EP data regions; and
   selecting the EP files associated with the adjusted target EP data regions and the set of EP data regions as the subset of the plurality of EP files for the clustering operation.

6. The method of claim 1, wherein the micro-partitions associated with the subset of the plurality of EP files for the clustering operation have a large degree of overlap.

7. A system comprising:
a memory; and
a processing device, operatively coupled to the memory, to:
   store table data in a plurality of micro-partitions of a storage device, wherein each of the plurality of micro-partitions comprises a portion of the table data, wherein subsets of the plurality of micro-partitions are associated with a respective one of a plurality of expression property (EP) files, and wherein each of the plurality of EP files comprises an EP data region that represents the portions of the table data of the subset of the plurality of micro-partitions associated with the EP file;
   determine sub-ranges of the table data based on the plurality of EP data regions of the plurality of EP files, wherein each sub-range corresponds to an interval between adjacent minimum values or adjacent maximum values among the plurality of EP data regions;
   for each sub-range of the sub-ranges, calculate a total average micro-partition depth of ones of the plurality of EP data regions comprising table data that overlaps the sub-range;
   determine from the plurality of EP data regions, a set of EP data regions that each comprise table data that overlap a deepest sub-range of the sub-ranges, the deepest sub range having a highest total average micro-partition depth;
   select a subset of the plurality of EP files for a clustering operation based at least in part on a number of micro-partitions represented by the set of EP data regions; and
   perform the clustering operation on the micro-partitions associated with the subset of the plurality of EP files to reduce an amount of memory required for the clustering operation.

8. The system of claim 7, wherein, to select the subset of the plurality of EP files for the clustering operation, the processing device is to:
   selectively remove at least one of the set of EP data regions until a sum of the micro-partitions associated with the set of EP data regions is less than a threshold value; and
   select the EP files associated with the set of EP data regions as the subset of the plurality of EP files for the clustering operation.

9. The system of claim 7, wherein, to select the subset of the plurality of EP files for the clustering operation, the processing device is to:
   select a seed EP data region from the set of EP data regions; and
   select as the subset of the plurality of EP files for the clustering operation, the EP files associated with the EP data regions of the plurality of EP data regions that overlap the seed EP data region.

10. The system of claim 9, wherein, to select the seed EP data region, the processing device is to:
   for each EP data region of the set of EP data regions, determine a subset of the plurality of EP data regions comprising table data that overlaps with table data of the EP data region of the set of EP data regions;
   calculate a sum of micro-partitions associated with each of the subsets of the EP data regions; and
   select the seed EP data region as the EP data region of the set of EP data regions associated with the subset of EP data regions having a highest sum of micro-partitions.

11. The system of claim 9, wherein, to select the EP files associated with the EP data regions of the plurality of EP data regions that overlap the seed EP data region as the subset of the plurality of EP files for the clustering operation, the processing device is to:
   determine a group of target EP data regions that comprise table data that overlaps the table data of the seed EP data region but not the deepest sub-range;
   selectively remove at least one of the target EP data regions from the group of the target EP data regions based on a number of micro-partitions associated with the at least one target EP data region to generate adjusted target EP data regions; and
   select the EP files associated with the adjusted target EP data regions and the set of EP data regions as the subset of the plurality of EP files for the clustering operation.

12. The system of claim 7, wherein the micro-partitions associated with the subset of the plurality of EP files for the clustering operation have a large degree of overlap.

13. A non-transitory computer-readable storage medium including instructions that, when executed by a processing device, cause the processing device to:
   store table data in a plurality of micro-partitions of a storage device, wherein each of the plurality of micro-partitions comprises a portion of the table data, wherein subsets of the plurality of micro-partitions are associated with a respective one of a plurality of expression property (EP) files, and wherein each of the plurality of EP files comprises an EP data region that represents the portions of the table data of the subset of the plurality of micro-partitions associated with the EP file;
   determine sub-ranges of the table data based on the plurality of EP data regions of the plurality of EP files, wherein each sub-range corresponds to an interval between adjacent minimum values or adjacent maximum values among the plurality of EP data regions;
   for each sub-range of the sub-ranges, calculate a total average micro-partition depth of ones of the plurality of EP data regions comprising table data that overlaps the sub-range;
   determine from the plurality of EP data regions, a set of EP data regions that each comprise table data that overlap a deepest sub-range of the sub-ranges, the deepest sub-range having a highest total average micro-partition depth;
   select a subset of the plurality of EP files for a clustering operation based at least in part on a number of micro-partitions represented by the set of EP data regions; and
   perform the clustering operation on the micro-partitions associated with the subset of the plurality of EP files to reduce an amount of memory required for the clustering operation.

14. The non-transitory computer-readable storage medium of claim 13, wherein, to select the subset of the plurality of EP files for the clustering operation, the processing device is to:
   selectively remove at least one of the set of EP data regions until a sum of the micro-partitions associated with the set of EP data regions is less than a threshold value; and
   select the EP files associated with the set of EP data regions as the subset of the plurality of EP files for the clustering operation.

15. The non-transitory computer-readable storage medium of claim 13, wherein, to select the subset of the plurality of EP files for the clustering operation, the processing device is to:

select a seed EP data region from the set of EP data regions; and select as the subset of the plurality of EP files for the clustering operation, the EP files associated with the EP data regions of the plurality of EP data regions that overlap the seed EP data region.

16. The non-transitory computer-readable storage medium of claim 15, wherein, to select the seed EP data region, the processing device is to:

for each EP data region of the set of EP data regions, determine a subset of the plurality of EP data regions comprising table data that overlaps with table data of the EP data region of the set of EP data regions;

calculate a sum of micro-partitions associated with each of the subsets of the EP data regions; and select the seed EP data region as the EP data region of the set of EP data regions associated with the subset of EP data regions having a highest sum of micro-partitions.

17. The non-transitory computer-readable storage medium of claim 13, wherein the micro-partitions associated with the subset of the plurality of EP files for the clustering operation have a large degree of overlap.

* * * * *